(12) United States Patent
Osterloh et al.

(10) Patent No.: US 7,479,895 B2
(45) Date of Patent: Jan. 20, 2009

(54) DATA COMMUNICATION PROTOCOL IN AN AUTOMATIC METER READING SYSTEM

(75) Inventors: Christopher L. Osterloh, Waseca, MN (US); Christopher Nagy, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 135 days.

(21) Appl. No.: 11/347,026

(22) Filed: Feb. 3, 2006

(65) Prior Publication Data
US 2006/0202856 A1    Sep. 14, 2006

Related U.S. Application Data

(63) Continuation-in-part of application No. 10/915,706, filed on Aug. 10, 2004.

(60) Provisional application No. 60/649,717, filed on Feb. 3, 2005, provisional application No. 60/500,550, filed on Sep. 5, 2003.

(51) Int. Cl.
*G08B 23/00* (2006.01)
(52) U.S. Cl. .............. 340/870.02; 340/870.03
(58) Field of Classification Search ............ 340/870.02, 340/870.03
See application file for complete search history.

(56) References Cited

U.S. PATENT DOCUMENTS

| | | | |
|---|---|---|---|
| 4,614,945 A | 9/1986 | Brunius et al. | |
| 5,184,314 A | 2/1993 | Kelly et al. | |
| 5,194,860 A | 3/1993 | Jones et al. | |
| 5,339,330 A | 8/1994 | Mallinckrodt | |
| 5,432,814 A * | 7/1995 | Hasegawa | 375/133 |
| 5,446,756 A | 8/1995 | Mallinckrodt | |
| 5,459,459 A | 10/1995 | Lee, Jr. | |
| 5,477,216 A | 12/1995 | Lee, Jr. et al. | |
| 5,673,252 A | 9/1997 | Johnson et al. | |
| 5,694,391 A | 12/1997 | Diachina et al. | |
| 5,914,673 A | 6/1999 | Jennings et al. | |
| 5,918,380 A * | 7/1999 | Schleich et al. | 340/870.02 |
| 6,006,212 A | 12/1999 | Schleich et al. | |
| 6,100,817 A | 8/2000 | Mason, Jr. et al. | |
| 6,181,257 B1 | 1/2001 | Meek et al. | |
| 6,246,677 B1 | 6/2001 | Nap et al. | |
| 6,262,672 B1 | 7/2001 | Brooksby et al. | |
| 6,333,975 B1 | 12/2001 | Brunn et al. | |
| 6,411,219 B1 | 6/2002 | Slater | |

(Continued)

FOREIGN PATENT DOCUMENTS

EP    0420295 A1    4/1991

*Primary Examiner*—Albert K Wong
(74) *Attorney, Agent, or Firm*—Patterson, Thuente, Skaar & Christensen, P.A.

(57) ABSTRACT

An automatic meter reading (AMR) system includes a fixed or mobile reader and an endpoint interfaced to a utility meter. The fixed or mobile reader is capable of communicating with the endpoint via RF communication. The fixed or mobile reader sends a message to the endpoint that includes a response mode direction which directs the endpoint to respond to the reader via either a mobile network mode or a fixed network mode. The AMR system allows implementation of, and migration between, one-way, one-and-a-half-way, and two-way communications system modes without requiring reprogramming, reconfiguring the metering endpoints or going through a reconfiguration cycle before effecting a communication 20 Claims, 30 Drawing Sheets

U.S. PATENT DOCUMENTS

| | | | |
|---|---|---|---|
| 6,538,577 B1 * | 3/2003 | Ehrke et al. | 340/870.02 |
| 6,710,721 B1 | 3/2004 | Holowick | |
| 6,798,352 B2 | 9/2004 | Holowick | |
| 2001/0019321 A1 | 9/2001 | Brooksby et al. | |
| 2003/0025612 A1 | 2/2003 | Holmes et al. | |

* cited by examiner

Two Way 1430 MHz-Reader

| Quantity | Value |
|---|---|
| Operational Mode(s) | Fixed and Mobile |
| Frequency Band | 1427.0 to 1432.0 MHz |
| Channel Bandwidth | 50 KHz (6.25 kHZ center freq) |
| Modulation Scheme | FSK (spectral shaping allowed) |
| Deviation | +/-15KHz(+/-500Hz) |
| Encoding | Manchester |
| Bit Rate | 1,512 ticks of an ideal 8.000 MHz clock (Tolerance 0.1%) |
| Frequency Stability | +/- 1 ppm - CCU<br>+/- 1 ppm - DCU<br>+/- 1.5 ppm-HHC |
| Minimum RX Sensitivity | -113 dBm for 0.01% BER - CCu<br>-110 dBm for 0.01% BER - DCU<br>-105 dBm for 0.01% BER - HHC |
| TX Power | +36 dBm (-1/+1 dB) EIRP - CCU<br>+30 dBm (-1/+1 dB) EIRP - CCU<br><br>+30 dBm (-1/+1 dB) EIRP - DCU<br>+14 dBm (-1/+1 dB) EIRP - HHC |
| Preamble Length | 24 bits |
| TX Modes - Transmitted Value | 01 - CCU<br>00 - DCU<br>00 - HHC |

FIG. 2

Two Way 1430 MHz - EndPoint
Date Rate 1

| Quantity | Value |
|---|---|
| Operational Mode(s) | Fixed and Mobile |
| Frequency Band | 1427.0 to 1432.0 MHz |
| Channel Bandwidth | 50 KHz (6.25 kHZ center freq) |
| Modulation Scheme | FSK (spectral shaping allowed) |
| Deviation | +/-12.5 KHz(+/-KHz tolerance) |
| Encoding | Manchester |
| Bit Rate | 704 ticks of an ideal 8.000 MHz clock (Tolerance 0.5%) |
| Frequency Stability | +/- 2 ppm |
| Minimum RX Sensitivity | -105 dBm for 0.01% BER |
| TX Power | +14 dBm (-1/+1 dB) for TX Mode 00<br>+30 dBm (-1/+1 dB) for TX Mode 01 |
| Minimum Preamble Length | 24 bits |
| Factory Default Frequency | The endpoint will always have the factory default frequency of 1431.925 MHz (FCC Channel 349) programmed into channel 15 (Default receive channel) |

FIG. 3A

Two Way 1430 MHz - EndPoint
Date Rate 2

| Quantity | Value |
|---|---|
| Operational Mode(s) | Fixed and Mobile |
| Frequency Band | 1427.0 to 1432.0 MHz |
| Channel Bandwidth | 50 KHz (6.25 kHZ center freq) |
| Modulation Scheme | FSK (spectral shaping allowed) |
| Deviation | +/-12.5 KHz(+/-1 KHz tolerance) |
| Encoding | NRZ with bit stuffing (1 in 7?) |
| Bit Rate | 352 ticks of an ideal 8.000 MHz clock (Tolerance 0.5%) |
| Frequency Stability | +/- 2 ppm |
| Minimum RX Sensitivity | -105 dBm for 0.01% BER |
| TX Power | +14 dBm (-1/+1 dB) for TX Mode 00<br>+30 dBm (-2/+0 dB) for TX Mode 01 |
| Preamble Length | 24 bits |
| Factory Default Frequency | The endpoint will always have the factory default frequency of 1431.925 MHz (FCC Channel 349) programmed into channel 15 (Default receive channel) |

FIG. 3B

One Way 1430 MHz - EndPoint

| Quantity | Value |
|---|---|
| Operational Mode(s) | Fixed and Mobile |
| Frequency Band | 1427.0 to 1432.0 MHz |
| Channel Bandwidth | 50 KHz (6.25 kHZ center freq) |
| Modulation Scheme | FSK (Specifically TFM) |
| Deviation | +/-12.5 KHz (+/-1 KHz tolerance) |
| Encoding | NRZ |
| Bit Rate | 352 ticks of an ideal 8.000 MHz clock (Tolerance 0.5%) |
| Frequency Stability | +/- 2 ppm |
| Minimum RX Sensitivity | N.A. (Programming RX-80 dBm) |
| TX Power | +14 dBm (-2/+1 dB) |
| Preamble Length | 24 bits |
| Programming receiver default frequency | The endpoint will leave the factory with a default frequency of 1431.925MHz (FCC Channel 349) in the programming receiver. |

FIG. 4

Manchester Encoding Structure

In this example:
Timer "0" = 0001110110
Timer "1" = 1110001001

Counter Value = 8

0 0 0 0 1 0 0 0
0001110110 0001110110 0001110110 0001110110 1110001001 0001110110 0001110110 0001110110 0001110110

Counter Value = 7

0 0 0 0 0 1 1 1
0001110110 0001110110 0001110110 0001110110 0001110110 1110001001 1110001001 1110001001

Sequence Inversion Keyed Countdown Timer

FIG. 6

| 0 | Preamble |
|---|---|
| 1 | Preamble |
| 2 | Preamble |
| 3 | Length |
| 4 | Length_BAR |
| 5 | EPID HI |
| 6 | EPID |
| 7 | EPID |
| 8 | EPID LO |
| 9 | Endpoint_Type |
| 10 | Message Type |
| 11 | Flags |
| 12 | Message |

| n-2 | Message |
|---|---|
| n-1 | CRC HI |
| n | CRC LO |

FIG. 7

| | |
|---|---|
| 0 | Preamble |
| 1 | Preamble |
| 2 | Preamble |
| 3 | EPID HI |
| 4 | EPID |
| 5 | EPID |
| 6 | EPID LO |
| 7 | Endpoint_Type |
| 8 | Decode Type |
| 9 | Flags |
| 10 | Consumption_HI |
| 11 | Consumption |
| 12 | Consumption |
| 13 | Consumption_LO |
| 14 | Tamper_HI |
| 15 | Tamper_LO |
| 16 | Reserved-Type Specific |
| 17 | Reserved-Type Specific |
| 18 | CRC HI |
| 19 | CRC LO |

FIG. 8

| P | Preamble |
|---|---|
| P | Preamble |
| P | Preamble |
| 0 | System ID |
| 1 | Frame ID |
| 2 | Cell ID |
| 3 | RTC_HI |
| 4 | RTC |
| 5 | RTC |
| 6 | RTC_LO |
| 7 | Command_Flags 1 |
| 8 | Command_Flags 2 |
| 9 | Slot Offset |
| 10 | First_UM_HI |
| 11 | First_UM_LO |
| 12 | EPID_HI |
| 13 | EPID |
| 14 | EPID |
| 15 | EPID_LO |
| 16 | Security_HI |
| 17 | Security_LO |
| 18 | Command Set |
| 19 | Command |
| 20 | Command_Body_HI |
| 21 | Command_Body_LO |
| 22 | Response_Freq_HI |
| 23 | Response_Freq_LO |
| 24 | Reserved |
| 25 | Length of Extended C & C |
| 26 | CRC_HI |
| 27 | CRC_LO |

Note: All bytes are sent MSB first.

FIG. 9A

| | |
|---|---|
| P | Preamble |
| P | Preamble |
| P | Preamble |
| 0 | System ID |
| 1 | Command_Flags |
| 2 | EPID_HI |
| 3 | EPID |
| 4 | EPID |
| 5 | EPID_LO |
| 6 | Security_HI |
| 7 | Security_LO |
| 8 | Number of Commands |
| 9 | Command 1 |
| 10 | Command_1_Body HI |
| 11 | Command_1_Body LO |
| 12 | Command 2 |
| 13 | Command_2_Body HI |
| 14 | Command_1_Body LO |

• •
• •
• •

| | |
|---|---|
| j-6 | Command_n |
| j-5 | Command_n_Body HI |
| j-4 | Command_n_Body LO |
| j-3 | Reserved |
| j-2 | Reserved |
| j-1 | CRC_HI |
| j | CRC_LO |

Note: All bytes are sent MSB first.

FIG. 9B

Universal Command Types

| Value | Bit Value | Command Type | Command Body | Response Message Type |
|---|---|---|---|---|
| 0 | 00000000 | Report Status | 0x0000 | 0 |
| 1 | 00000001 | Change System Number | New System Number | 75 |
| 2 | 00000010 | Change Group Number | New Group Number | 75 |
| 3 | 00000011 | Change Subgroup Number | New Subgroup Number | 75 |
| 4 | 00000100 | Change System Slot Number | New System Slot Number | 75 |
| 5 | 00000101 | Change Group Slot Number | New Group Slot Number | 75 |
| 6 | 00000110 | Change Subgroup Slot Number | New Subgroup Slot Number | 75 |
| 7 | 00000111 | Changes Cell ID | New Cell ID | 75 |
| 8 | 00001000 | Report Slot Numbers | 0x0000 | 75 |
| 9 | 00001001 | Resend Packet | Packet Number to Resend | varies |
| 10 | 00001010 | Set Receiver Bubble-Up Period | Time in tenths of sec. | 75 |
| 11 | 00001011 | Changes PN Sequence | New PN Sequence | 75 |
| 12 | 00001100 | Set High_Power Bubble Up Channel | Channel Number | 75 |
| 13 | 00001101 | Set High-Power Bubble-Up Period | Time in Minutes | 75 |
| 14 | 00001110 | Enable/Disable High-Power Bubble-Up | 0x0000 to Disable Any non-zero value to enable | 75 |
| 15 | 00001111 | <<Reserved>> | 0x0000 | n/a |
| 16 | 00010000 | <<Reserved>> | 0x0000 | n/a |
| 17 | 00010001 | <<Reserved>> | 0x0000 | n/a |
| 18 | 00010010 | <<Reserved>> | 0x0000 | n/a |
| 19 | 00010011 | <<Reserved>> | 0x0000 | n/a |
| 20 | 00010100 | Reset Endpoint Password | New Password | n/a |
| 21 | 00010101 | Reset XOR Data Mask | New XOR Data Mask | n/a |
| 22 | 00010110 | <<Reserved>> | 0x0000 | n/a |
| 23 | 00010111 | <<Reserved>> | 0x0000 | n/a |
| 24 | 00011000 | <<Reserved>> | 0x0000 | n/a |
| 25 | 00011001 | <<Reserved>> | 0x0000 | n/a |
| 26 | 00011010 | <<Reserved>> | 0x0000 | n/a |
| 27 | 00011011 | <<Reserved>> | 0x0000 | n/a |
| 28 | 00011100 | <<Reserved>> | 0x0000 | n/a |
| 29 | 00011101 | <<Reserved>> | 0x0000 | n/a |
| 30 | 00011110 | <<Reserved>> | 0x0000 | n/a |
| 31 | 00011111 | <<Reserved>> | 0x0000 | n/a |
| 32 | 00100000 | Configure Tx Power | Level in dBm (integer, 0=-20) | 75 |
| 33 | 00100001 | Set Channel Frequency (3.2.1) | Channel Number | 75 |
| 34 | 00100010 | Set Deviation | New Deviation | 75 |
| 35 | 00100011 | Set Data Rate | New Data Rate | 75 |
| 36 | 00100100 | <<Reserved>> | 0x0000 | n/a |
| 37 | 00100101 | <<Reserved>> | 0x0000 | n/a |

FIG. 10

Universal Command Types

| Value | Bit Value | Command Type | Command Body | Response Message Type |
|---|---|---|---|---|
| 38 | 00100110 | <<Reserved>> | 0x0000 | n/a |
| 39 | 00100111 | <<Reserved>> | 0x0000 | n/a |
| 40 | 00101000 | <<Reserved>> | 0x0000 | n/a |
| 41 | 00101001 | <<Reserved>> | 0x0000 | n/a |
| 42 | 00101010 | <<Reserved>> | 0x0000 | n/a |
| 43 | 00101011 | <<Reserved>> | 0x0000 | n/a |
| 44 | 00101100 | <<Reserved>> | 0x0000 | n/a |
| 45 | 00101101 | <<Reserved>> | 0x0000 | n/a |
| 46 | 00101110 | <<Reserved>> | 0x0000 | n/a |
| 47 | 00101111 | <<Reserved>> | 0x0000 | n/a |
| 48 | 00110000 | Multiple Ungrouped Endpoint (3.2.3.1) | Multiple Addressed Endpoint Slot Number | See 3.2.4.1 |
| 49 | 00110001 | Vector and Listen (3.2.3.2.) | Slot Number | See 3.2.4.2 |
| 50 | 00110010 | Multiple Commands to Individual Endpoint (3.2.3.3.) | Slot Number | See 3.2.4.3 |
| 51 | 00110011 | <<Reserved>> | 0x0000 | n/a |
| 52 | 00110100 | <<Reserved>> | 0x0000 | n/a |
| 53 | 00110101 | <<Reserved>> | 0x0000 | n/a |
| 54 | 00110110 | <<Reserved>> | 0x0000 | n/a |
| 55 | 00110111 | <<Reserved>> | 0x0000 | n/a |
| 56 | 00111000 | <<Reserved>> | 0x0000 | n/a |
| 57 | 00111001 | <<Reserved>> | 0x0000 | n/a |
| 58 | 00111010 | <<Reserved>> | 0x0000 | n/a |
| 59 | 00111011 | <<Reserved>> | 0x0000 | n/a |
| 60 | 00111100 | <<Reserved Engineering Use Only>> | 0x0000 | n/a |
| 61 | 00111101 | <<Reserved Engineering Use Only>> | 0x0000 | n/a |
| 62 | 00111110 | <<Reserved Engineering Use Only>> | 0x0000 | n/a |
| 63 | 00111111 | <<Reserved Engineering Use Only>> | 0x0000 | n/a |

FIG. 10 (cont'd)

Type Specific Commands

| Value | Bit Value | Command Type | Command Body | Response Message Type |
|---|---|---|---|---|
| 64 | 01000000 | Report Encoder/Meter Status | 0x0000 | 32 |
| 65 | 01000001 | Report Consumption | 0x0000 | 1 |
| 66 | 01000010 | Report Consumption/Tamper | 0x0000 | 2 |
| 67 | 01000011 | Report Interval Data | 0x0000 | 3 |
| 68 | 01000100 | Report TOU Data | 0x0000 | 4 |
| 69 | 01000101 | Reset TOU Data | 0x0000 | 75 |
| 70 | 01000110 | Report Daily Read Data | 0x0000 | 5 |
| 71 | 01000111 | Report Multi-Encoder Consumption | 0x0000 | 6 |
| 72 | 01001000 | Report Multi-Encoder Consumption with Tamper | 0x0000 | 7 |
| 73 | 01001001 | Report Default Message | 0x0000 | Default |
| 74 | 01001010 | Report Logged Data | 0x0000 | 10 |
| 75 | 01001011 | <<Reserved>> | 0x0000 | n/a |
| 76 | 01001100 | <<Reserved>> | 0x0000 | n/a |
| 77 | 01001101 | <<Reserved>> | 0x0000 | n/a |
| 78 | 01001110 | <<Reserved>> | 0x0000 | n/a |
| 79 | 01001111 | <<Reserved>> | 0x0000 | n/a |
| 80 | 01010000 | <<Reserved>> | 0x0000 | n/a |
| 81 | 01010001 | <<Reserved>> | 0x0000 | n/a |
| 82 | 01010010 | <<Reserved>> | 0x0000 | n/a |
| 83 | 01010011 | <<Reserved>> | 0x0000 | n/a |
| 84 | 01010100 | Report Temperature | 0x0000 | 20 |
| 85 | 01010101 | <<Reserved>> | 0x0000 | n/a |
| 86 | 01010110 | <<Reserved>> | 0x0000 | n/a |
| 87 | 01010111 | <<Reserved>> | 0x0000 | n/a |
| 88 | 01011000 | <<Reserved>> | 0x0000 | n/a |
| 89 | 01011001 | <<Reserved>> | 0x0000 | n/a |
| 90 | 01011010 | Set Configuration Flags 1 | See Figure 3.1.2.1 | 75 |
| 91 | 01011011 | Set Configuration Flags 2 | See Figure 3.1.2.2 | 75 |
| 92 | 01011100 | Set Configuration Flags 3 | See Figure 3.1.2.3 | 75 |
| 93 | 01011101 | Initialize 16 LSB of Consumption | New Consumption (low half) | 75 |
| 94 | 01011110 | Initialize 16 MSB of Consumption | New Consumption (high half) | 75 |
| 95 | 01011001 | <<Reserved>> | 0x0000 | n/a |
| 96 | 01100000 | Program Daily Read Latch Time | Hour of Day (Midnight=0, Noon=12, 11:00 PM=23) | 75 |
| 97 | 01100001 | Set Interval Data Bucket Size | Size, in minutes | 75 |
| 98 | 01100010 | Set Default Message | Type of Default Message | 75 |
| 99 | 01100011 | Set Default Message Body | Default Message Body | n/a |
| 100 | 01100100 | Acknowledge Alarm | Message Type of Alarm | None |

FIG. 11

| Value | Bit Value | Command Type | Command Body | Response Message Type |
|---|---|---|---|---|
| 101 | 01100101 | <<Reserved>> | 0x0000 | n/a |
| 102 | 01100110 | <<Reserved>> | 0x0000 | n/a |
| 103 | 01100111 | <<Reserved>> | 0x0000 | n/a |
| 104 | 01101000 | <<Reserved>> | 0x0000 | n/a |
| 105 | 01001001 | <<Reserved>> | 0x0000 | n/a |
| 106 | 01101010 | <<Reserved>> | 0x0000 | n/a |
| 107 | 01101011 | <<Reserved>> | 0x0000 | n/a |
| 108 | 01101100 | <<Reserved>> | 0x0000 | n/a |
| 109 | 01101101 | <<Reserved>> | 0x0000 | n/a |
| 110 | 01101110 | <<Reserved>> | 0x0000 | n/a |
| 111 | 01101111 | <<Reserved>> | 0x0000 | n/a |
| 112 | 01110000 | <<Reserved>> | 0x0000 | n/a |
| 113 | 01110001 | <<Reserved>> | 0x0000 | n/a |
| 114 | 01110010 | <<Reserved>> | 0x0000 | n/a |
| 115 | 01110011 | <<Reserved>> | 0x0000 | n/a |
| 116 | 01110100 | <<Reserved>> | 0x0000 | n/a |
| 117 | 01110101 | <<Reserved>> | 0x0000 | n/a |
| 118 | 01110110 | <<Reserved>> | 0x0000 | n/a |
| 119 | 01110111 | <<Reserved>> | 0x0000 | n/a |
| 120 | 01111000 | <<Reserved>> | 0x0000 | n/a |
| 121 | 01111001 | <<Reserved>> | 0x0000 | n/a |
| 122 | 01111010 | <<Reserved>> | 0x0000 | n/a |
| 123 | 01111011 | <<Reserved>> | 0x0000 | n/a |
| 124 | 01111100 | <<Reserved>> | 0x0000 | n/a |
| 125 | 01111101 | <<Reserved>> | 0x0000 | n/a |
| 126 | 01111110 | <<Reserved>> | 0x0000 | n/a |
| 127 | 01111111 | <<Reserved>> | 0x0000 | n/a |
| 128 | 10000000 | <<Reserved>> | 0x0000 | n/a |
| 129 | 10000001 | <<Reserved>> | 0x0000 | n/a |
| 130 | 10000010 | <<Reserved>> | 0x0000 | n/a |
| 131 | 10000011 | <<Reserved>> | 0x0000 | n/a |
| 132 | 10000100 | <<Reserved>> | 0x0000 | n/a |
| 133 | 10000101 | <<Reserved>> | 0x0000 | n/a |
| 134 | 10000110 | <<Reserved>> | 0x0000 | n/a |
| 135 | 10000111 | <<Reserved>> | 0x0000 | n/a |
| 136 | 10001000 | <<Reserved>> | 0x0000 | n/a |
| 137 | 10001001 | <<Reserved>> | 0x0000 | n/a |
| 138 | 10001010 | <<Reserved>> | 0x0000 | n/a |
| 139 | 10001011 | <<Reserved>> | 0x0000 | n/a |
| 140 | 10001100 | <<Reserved>> | 0x0000 | n/a |
| 141 | 10001101 | <<Reserved>> | 0x0000 | n/a |

FIG. 11
(cont'd)

| Value | Bit Value | Command Type | Command Body | Response Message Type |
|---|---|---|---|---|
| 142 | 10001110 | <<Reserved>> | 0x0000 | n/a |
| 143 | 10001111 | <<Reserved>> | 0x0000 | n/a |
| 144 | 10010000 | <<Reserved>> | 0x0000 | n/a |
| 145 | 10010001 | <<Reserved>> | 0x0000 | n/a |
| 146 | 10010010 | <<Reserved>> | 0x0000 | n/a |
| 147 | 10010011 | <<Reserved>> | 0x0000 | n/a |
| 148 | 10010100 | <<Reserved>> | 0x0000 | n/a |
| 149 | 10010101 | <<Reserved>> | 0x0000 | n/a |
| 150 | 10010110 | Report Event Summary | 0x0000 | 150 |
| 151 | 10010111 | Report Individual Event Information | Event Number (1=most recent, 2=next most recent, max 4) | varies |
| 152 | 10011000 | <<Reserved>> | 0x0000 | n/a |
| 153 | 10011001 | <<Reserved>> | 0x0000 | n/a |
| 154 | 10011010 | <<Reserved>> | 0x0000 | n/a |
| 155 | 10011011 | <<Reserved>> | 0x0000 | n/a |
| 156 | 10011100 | <<Reserved>> | 0x0000 | n/a |
| 157 | 10011101 | <<Reserved>> | 0x0000 | n/a |
| 158 | 10011110 | <<Reserved>> | 0x0000 | n/a |
| 159 | 10011111 | <<Reserved>> | 0x0000 | n/a |
| 160 | 10100000 | <<Reserved>> | 0x0000 | n/a |
| 161 | 10100001 | <<Reserved>> | 0x0000 | n/a |
| 162 | 10100010 | <<Reserved>> | 0x0000 | n/a |
| 163 | 10100011 | <<Reserved>> | 0x0000 | n/a |
| 164 | 10100100 | <<Reserved>> | 0x0000 | n/a |
| 165 | 10100101 | <<Reserved>> | 0x0000 | n/a |
| 166 | 10100110 | <<Reserved>> | 0x0000 | n/a |
| 167 | 10100111 | <<Reserved>> | 0x0000 | n/a |
| 168 | 10101000 | <<Reserved>> | 0x0000 | n/a |
| 169 | 10101001 | <<Reserved>> | 0x0000 | n/a |
| 170 | 10101010 | <<Reserved>> | 0x0000 | n/a |
| 171 | 10101011 | <<Reserved>> | 0x0000 | n/a |
| 172 | 10101100 | <<Reserved>> | 0x0000 | n/a |
| 173 | 10101101 | <<Reserved>> | 0x0000 | n/a |
| 174 | 10101110 | <<Reserved>> | 0x0000 | n/a |
| 175 | 10101111 | <<Reserved>> | 0x0000 | n/a |
| 176 | 10110000 | <<Reserved>> | 0x0000 | n/a |
| 177 | 10110001 | <<Reserved>> | 0x0000 | n/a |
| 178 | 10110010 | <<Reserved>> | 0x0000 | n/a |
| 179 | 10110011 | <<Reserved>> | 0x0000 | n/a |
| 180 | 10110100 | <<Reserved>> | 0x0000 | n/a |

FIG. 11
(cont'd)

| Value | Bit Value | Command Type | Command Body | Response Message Type |
|---|---|---|---|---|
| 181 | 10110101 | <<Reserved>> | 0x0000 | n/a |
| 182 | 10110110 | <<Reserved>> | 0x0000 | n/a |
| 183 | 10110111 | <<Reserved>> | 0x0000 | n/a |
| 184 | 10111000 | <<Reserved>> | 0x0000 | n/a |
| 185 | 10111001 | <<Reserved>> | 0x0000 | n/a |
| 186 | 10111010 | <<Reserved>> | 0x0000 | n/a |
| 187 | 10111011 | <<Reserved>> | 0x0000 | n/a |
| 188 | 10111100 | <<Reserved>> | 0x0000 | n/a |
| 189 | 10111100 | <<Reserved>> | 0x0000 | n/a |
| 190 | 10111110 | <<Reserved>> | 0x0000 | n/a |
| 191 | 10111111 | <<Reserved>> | 0x0000 | n/a |
| 192 | 11000000 | <<Reserved>> | 0x0000 | n/a |
| 193 | 11000001 | <<Reserved>> | 0x0000 | n/a |
| 194 | 11000010 | <<Reserved>> | 0x0000 | n/a |
| 195 | 11000011 | <<Reserved>> | 0x0000 | n/a |
| 196 | 11000100 | <<Reserved>> | 0x0000 | n/a |
| 197 | 11000101 | <<Reserved>> | 0x0000 | n/a |
| 198 | 11000110 | <<Reserved>> | 0x0000 | n/a |
| 199 | 11000111 | <<Reserved>> | 0x0000 | n/a |
| 200 | 11001000 | Perform EP Diagnostic: ROM check | 0x0000 | 200 |
| 201 | 11001001 | Perform EP Diagnostic: ROM check | 0x0000 | 200 |
| 202 | 11001010 | Perform EP Diagnostic: HW check | Test Point Number | 200 |
| 203 | 11001011 | Report RSSI | 0x0000 | 203 |
| 204 | 11001100 | <<Reserved>> | 0x0000 | n/a |
| 205 | 11001101 | Report Current RTC | 0x0000 | 205 |
| 206 | 11001110 | <<Reserved>> | 0x0000 | n/a |
| 207 | 11001111 | <<Reserved>> | 0x0000 | n/a |
| 208 | 11010000 | <<Reserved>> | 0x0000 | n/a |
| 209 | 11010001 | <<Reserved>> | 0x0000 | n/a |
| 210 | 11010010 | Test: Genereate UM | 0x0000 | See 3.2.3.1 |
| 211 | 11010011 | Enter Screaming Viking Mode | Number of Seconds | See 3.2.3.2 |
| 212 | 11010100 | <<Reserved>> | 0x0000 | n/a |
| 213 | 11010101 | <<Reserved>> | 0x0000 | n/a |
| 214 | 11010110 | <<Reserved>> | 0x0000 | n/a |
| 215 | 11010111 | <<Reserved>> | 0x0000 | n/a |
| 216 | 11011000 | <<Reserved>> | 0x0000 | n/a |
| 217 | 11011001 | <<Reserved>> | 0x0000 | n/a |
| 218 | 11011010 | <<Reserved>> | 0x0000 | n/a |
| 219 | 11011011 | <<Reserved>> | 0x0000 | n/a |
| 220 | 11011100 | Report Information Memory Contents | 0x0000 | 254 |

FIG. 11
(cont'd)

| Value | Bit Value | Command Type | Command Body | Response Message Type |
|---|---|---|---|---|
| 221 | 11011101 | Report EEPROM Contents | 0x0000 | 255 |
| 222 | 11011110 | <<Reserved>> | 0x0000 | n/a |
| 223 | 11011111 | <<Reserved>> | 0x0000 | n/a |
| 224 | 11100000 | <<Reserved>> | 0x0000 | n/a |
| 225 | 11100001 | <<Reserved>> | 0x0000 | n/a |
| 226 | 11100010 | <<Reserved>> | 0x0000 | n/a |
| 227 | 11100011 | <<Reserved>> | 0x0000 | n/a |
| 228 | 11100100 | <<Reserved>> | 0x0000 | n/a |
| 229 | 11100101 | <<Reserved>> | 0x0000 | n/a |
| 230 | 11100110 | <<Reserved Engineering Use Only>> | 0x0000 | n/a |
| 231 | 11100111 | <<Reserved Engineering Use Only>> | 0x0000 | n/a |
| 232 | 11101000 | <<Reserved Engineering Use Only>> | 0x0000 | n/a |
| 233 | 11101001 | <<Reserved Engineering Use Only>> | 0x0000 | n/a |
| 234 | 11101010 | <<Reserved Engineering Use Only>> | 0x0000 | n/a |
| 235 | 11101011 | <<Reserved Engineering Use Only>> | 0x0000 | n/a |
| 236 | 11101100 | <<Reserved Engineering Use Only>> | 0x0000 | n/a |
| 237 | 11101101 | <<Reserved Engineering Use Only>> | 0x0000 | n/a |
| 238 | 11101110 | <<Reserved Engineering Use Only>> | 0x0000 | n/a |
| 239 | 11101111 | <<Reserved Engineering Use Only>> | 0x0000 | n/a |
| 240 | 11110000 | <<Reserved Engineering Use Only>> | 0x0000 | n/a |
| 241 | 11110001 | <<Reserved Engineering Use Only>> | 0x0000 | n/a |
| 242 | 11110010 | <<Reserved Engineering Use Only>> | 0x0000 | n/a |
| 243 | 11110011 | <<Reserved Engineering Use Only>> | 0x0000 | n/a |
| 244 | 11110100 | <<Reserved Engineering Use Only>> | 0x0000 | |
| 245 | 11110101 | <<Reserved Engineering Use Only>> | 0x0000 | n/a |
| 246 | 11110110 | <<Reserved Engineering Use Only>> | 0x0000 | n/a |

FIG. 11
(cont'd)

| Value | Bit Value | Command Type | Command Body | Response Message Type |
|---|---|---|---|---|
| 247 | 11110111 | <<Reserved Engineering Use Only>> | 0x0000 | n/a |
| 248 | 11111000 | <<Reserved Engineering Use Only>> | 0x0000 | n/a |
| 249 | 11111001 | <<Reserved Engineering Use Only>> | 0x0000 | n/a |
| 250 | 11111010 | <<Reserved Engineering Use Only>> | 0x0000 | n/a |
| 251 | 11111011 | <<Reserved Engineering Use Only>> | 0x0000 | n/a |
| 252 | 11111100 | <<Reserved Engineering Use Only>> | 0x0000 | n/a |
| 253 | 11111101 | <<Reserved Engineering Use Only>> | 0x0000 | n/a |
| 254 | 11111110 | <<Reserved Engineering Use Only>> | 0x0000 | n/a |
| 255 | 11111111 | <<Reserved Engineering Use Only>> | 0x0000 | n/a |

FIG. 11
(cont'd)

| | |
|---|---|
| P | Preamble |
| P | Preamble |
| P | Preamble |
| P | Preamble |
| P | Preamble |
| P | Preamble |
| P | Preamble |
| 0 | Length |
| 1 | Length_BAR |
| 2 | EP_1_ID_HI |
| 3 | EP_1_ID |
| 4 | EP_1_ID |
| 5 | EP_1_ID_LO |
| 6 | Command_1 |
| 7 | Command_Body_1_HI |
| 8 | Command_Body_1_LO |
| 9 | Response_Byte_1 |
| 10 | EP_2_ID_HI |
| 11 | EP_2_ID |
| 12 | EP_2_ID |
| 13 | EP_2_ID_LO |
| 14 | Command_2 |
| 15 | Command_Body_2_HI |
| 16 | Command_Body_2_LO |
| 17 | Response_Byte_2 |

● ● ●
● ● ●
● ● ●

| | |
|---|---|
| n-9 | EP_i_ID_HI |
| n-8 | EP_i_ID |
| n-7 | EP_i_ID |
| n-6 | EP_i_ID_LO |
| n-5 | Command_i |
| n-4 | Command_Body_i_HI |
| n-3 | Command_Body_i_LO |
| n-2 | Response_Byte_i |
| n-1 | CRC_HI |
| n | CRC_LO |

Note: As bytes are sent MSB first

Command 48: Multiple Ungrouped Endpoint Command

FIG. 12

| | |
|---|---|
| P | Preamble |
| P | Preamble |
| P | Preamble |
| P | Preamble |
| P | Preamble |
| P | Preamble |
| P | Preamble |
| P | Preamble |
| 0 | Length |
| 1 | Length_BAR |
| 2 | Message_Body_HI |
| 3 | Message_Body |
| 4 | Message_Body |

| | |
|---|---|
| n-3 | Message_Body |
| n-2 | Message_Body_LO |
| n-1 | CRC_HI |
| n | CRC_LO |

Note: All bytes are sent MSB first.

Command 49: Vector and Listen Frame

FIG. 13

| | |
|---|---|
| P | Preamble |
| P | Preamble |
| P | Preamble |
| P | Preamble |
| P | Preamble |
| P | Preamble |
| P | Preamble |
| P | Preamble |
| 0 | Length |
| 1 | Length_BAR |
| 2 | CMD_1 |
| 3 | CMD_1_Body_HI |
| 4 | CMD_1_Body_LO |
| 5 | CMD_2 |
| 6 | CMD_2_Body_HI |
| 7 | CMD_2_Body_LO |
| ⋮ | ⋮ |
| n-2 | CMD_n_Body_LO |
| n-1 | CRC_HI |
| n | CRC_LO |

Note: All bytes are sent MSB first.

Command 50: Multiple Commands to Individual Endpoint Frame

FIG. 14

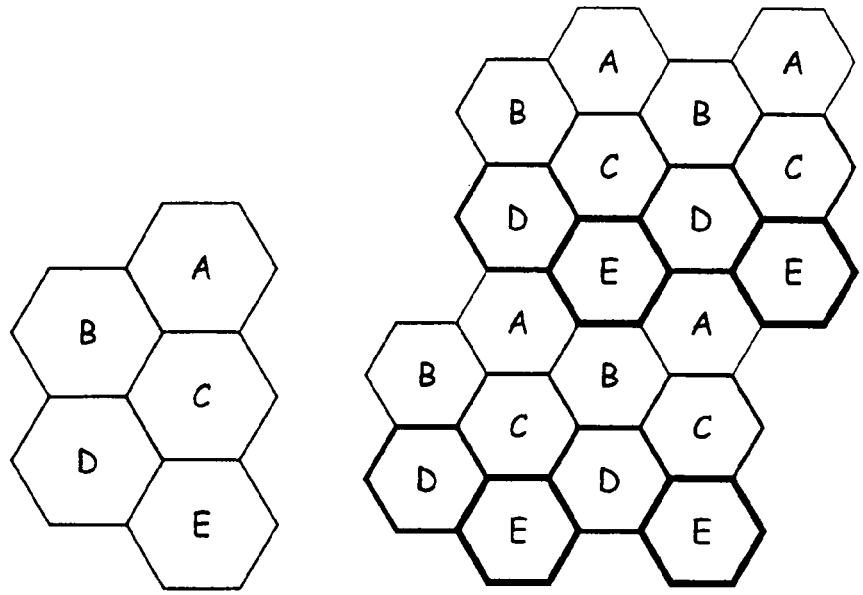

FIG. 19

| | | Quiet time | Slotted ALOHA receive time | Scheduled receive Time | Quiet time | | |
|---|---|---|---|---|---|---|---|
| | Channel 1 | Quiet time | Slotted ALOHA receive time | Scheduled receive Time | Quiet time | | |
| | Channel 2 | Quiet time | Slotted ALOHA receive time | Scheduled receive Time | Quiet time | | |
| Wake-UP Preamble (WUP) | Command & Control data | Quiet time | Slotted ALOHA receive time | Scheduled receive Time | Quiet time | Wake-UP Preamble (WUP) | Command & Control data |
| | Channel 4 | Quiet time | Slotted ALOHA receive time | Scheduled receive Time | Quiet time | | |
| | Channel 5 | Quiet time | Slotted ALOHA receive time | Scheduled receive Time | Quiet time | | |

FIG. 20

Manchester Encoding Structure

Sequence Inversion Keyed Countdown Timer

DATA COMMUNICATION PROTOCOL IN AN AUTOMATIC METER READING SYSTEM

CLAIM TO PRIORITY

The present application is a Continuation-in-Part of U.S. patent application Ser. No. 10/915,706, filed Aug. 10, 2004, and entitled "DATA COMMUNICATION PROTOCOL IN AN AUTOMATIC METER READING SYSTEM," which claims priority to U.S. Provisional Patent Application No. 60/500,550, filed on Sep. 5, 2003, and entitled, "DATA COMMUNICATION PROTOCOL IN AN AUTOMATIC METER READING SYSTEM," both of which are incorporated herein by reference. The present application also claims priority to U.S. Provisional Patent Application No. 60/649,717, filed on Feb. 3, 2005, and entitled, MULTI-MODE COMPATIBLE ENDPOINT FOR AN AUTOMATIC METER READING SYSTEM," which is incorporated herein by reference.

FIELD OF THE INVENTION

The present invention relates to automatic meter reading systems and, more particularly, to radio frequency (RF) based communication schemes and communication protocols used in remote automatic meter reading (AMR) systems.

BACKGROUND OF THE INVENTION

Automatic meter reading (AMR) systems are generally known in the art. Utility companies, for example, use AMR systems to read and monitor customer meters remotely, typically using radio frequency (RF) communication. AMR systems are favored by utility companies and others who use them because they increase the efficiency and accuracy of collecting readings and managing customer billing. For example, utilizing an AMR system for the monthly reading of residential gas, electric, or water meters eliminates the need for a utility employee to physically enter each residence or business where a meter is located to transcribe a meter reading by hand.

There are several different ways in which current AMR systems are configured. In a fixed network, endpoint devices at meter locations communicate with readers that collect readings and data using RF communication. There may be multiple fixed intermediate readers, or relays, located throughout a larger geographic area on utility poles, for example, with each endpoint device associated with a particular reader and each reader in turn communicating with a central system. Other fixed systems utilize only one central reader with which all endpoint devices communicate. In a mobile environment, a handheld unit or otherwise mobile reader with RF communication capabilities is used to collect data from endpoint devices as the mobile reader is moved from place to place.

AMR systems generally include one-way, one-and-a-half-way, or two-way communications capabilities. In a one-way system, an endpoint device periodically turns on, or "bubbles up," to send data to a receiver. One-and-a-half-way AMR systems include receivers that send wake-up signals to endpoint devices that in turn respond with readings. Two-way systems enable command and control between the endpoint device and a receiver/transmitter.

U.S. Pat. No. 5,914,673 to Jennings et al., for example, relates to an AMR system of the type used for reading utility meters by using a fixed RF network. The system disclosed by Jennings et al. is a network comprised of multiple cells, with each cell containing a single data concentrator unit and a typically large number of meter interface units. In operation, each meter interface unit is assigned a unique time displacement number and responds to a meter reading request from a data concentrator unit based upon its time displacement number.

Current automatic meter reading (AMR) systems are significantly limited in the information that can be obtained from the meter. Generally the AMR system comprises a reader and an endpoint that is interfaced to a meter. In a typical system, the endpoint obtains the consumption reading from the meter and then bubbles up every few seconds to send that consumption reading, via RF signal, to the reader. Alternatively, the endpoint receives a wake-up tone from the reader that prompts the endpoint to send the consumption reading to the reader.

All that is obtained from this configuration is a single consumption reading from the meter and that reading is based on what meter register the endpoint was programmed with initially at the factory.

Another challenge is that many utility operators use a mixed implementation of one-way, one-and-a-half-way, and two-way modes of communications. Changing needs or standards in the industry often require a utility operator to standardize on one particular mode of communication system. In addition, implementation of the different modes of communications varies throughout the world. In order to migrate from one mode of communications system to another, a reprogramming or reconfiguring cycle is required, which typically requires an expensive and time-consuming site visit.

There is, therefore, a need in the industry for an AMR system that addresses the above described problems or challenges in that there is a need for an AMR system that enables the user of the system to have more access to and more control over the information that the meter and endpoint can provide and that can migrate between one-way, one-and-a-half-way, and two-way communication modes without requiring a reprogramming.

SUMMARY OF THE INVENTION

A first embodiment of the present invention is a data communication protocol used between an endpoint and a reader in an automatic meter reading (AMR) system. The communication protocol enables the reader to have a conversation with the endpoint in that the reader can tell the meter what to do, it can reconfigure the meter, it can tell the endpoint to reconfigure the meter, it can request a specific response, it can request the endpoint to reprogram certain values in both the endpoint and the meter, it can request that the end point get specific information from the meter, return it to the end point, which returns it to the reader, and so forth.

According to one aspect of the first embodiment, an automatic meter reading (AMR) system includes a fixed or mobile reader and an endpoint. The endpoint is interfaced to a utility meter and the fixed or mobile reader is capable of communicating with the endpoint via RF communication. In this system the fixed or mobile reader sends a message to the endpoint that includes a response mode direction; the response mode direction from the reader tells the endpoint to respond to the reader either in a mobile network mode or a fixed network mode.

According to another embodiment of the invention, the reader uses a single RF communication protocol in communicating with the endpoint whether one-way communication or two-way communication is used. In still another embodiment of the invention, the RF communication between the endpoint and reader occurs through the use of a communication protocol that uses a data link layer that directs all outbound transmissions from the reader to the endpoint to be either Manchester encoded or transmitted as non-return to zero data. In still another embodiment of the invention, the communication protocol includes a transport layer that provides slotting control for all data transferred between the reader and the endpoint. In yet another embodiment of the present invention, the communication protocol utilizes a command and control frame for communication between the reader and endpoint. In still another embodiment of the present invention, a plurality of readers and endpoints are provided. The readers are quasi-synchronized in time to provide a control frame to at least one of the readers.

In an alternate embodiment, the invention allows implementation of, and migration between, one-way, one-and-a-half-way, and two-way communications systems or modes without requiring reprogramming, reconfiguring the metering endpoints or going through a reconfiguration cycle before effecting a communication.

According to one aspect of the alternate embodiment of the present invention, a method is provided of operating an endpoint capable of transmitting and receiving wireless radio-frequency (RF) communications via the AMR system. The method includes listening for an incoming communication initiation signal via the AMR system. The incoming communication includes one of a predefined first sequence and a predefined second sequence. A presence of the first sequence or the second sequence is detected in a received communication initiation signal. A detection of the first or the second sequence is responded to as follows: responding to a detection of the first sequence includes listening for any incoming instruction via the AMR system; and responding to a detection of the second sequence includes transmitting a first set of data via the AMR system.

A second aspect of the alternate embodiment of the present invention is directed to a utility meter endpoint that includes a central processing unit (CPU), a utility meter interface adapted to acquire utility meter information (such as, for example, utility consumption information, utility meter status, event history, and the like) for the CPU from a utility meter, and a radio-frequency (RF) transceiver interfaced with the CPU and adapted to receive and transmit wireless radio-communications via an AMR system. The endpoint is configured to operate in a receiving mode that is receptive to incoming radio communications from the AMR system. Furthermore, the endpoint is adapted to detect any incoming communication initiation signal that includes one of a known first sequence and a known second sequence. The endpoint is adapted to respond to the first sequence at least in part by operating in a receiving mode that is receptive to any incoming instructions, and to respond to the second sequence at least in part by operating in a transmit mode to send a first set of data via the AMR system.

The above summary of the invention is not intended to describe each illustrated embodiment or every implementation of the invention. The figures and the detailed description that follow more particularly exemplify these embodiments.

BRIEF DESCRIPTION OF THE DRAWINGS

FIG. 2 is a table containing the physical layer specifications of the reader.

FIG. 3A is a table containing the physical layer specifications of the endpoint at data rate 1.

FIG. 3B is a table containing the physical layer specification of the endpoint at data rate 2.

FIG. 4 is a table containing the physical layer specifications of the endpoint in a one-way AMR system.

FIG. 6 is an example of a Sequence Inversion Keyed Countdown Timer.

FIG. 7 diagrams the data packet structure.

FIG. 8 diagrams a high power pulse data packet structure.

FIG. 9A diagrams a two-way command and control frame.

FIG. 9B diagrams a one-way command and control frame.

FIG. 10 is a table containing universal command types for the data communication protocol of the present invention.

FIG. 11 is a table containing type specific commands for the data communication protocol of the present invention.

FIG. 12 diagrams command 48 of the data communication protocol, Multiple Ungrouped Endpoint Command.

FIG. 13 diagrams command 49 of the data communication protocol, Vector and Listen Frame.

FIG. 14 diagrams command 50 of the data communication protocol, Multiple Commands to Individual Endpoint.

FIG. 19 is an example of a five-cell cellular reuse pattern.

FIG. 20 depicts mobile operation of the system over five channels.

Figure 1:
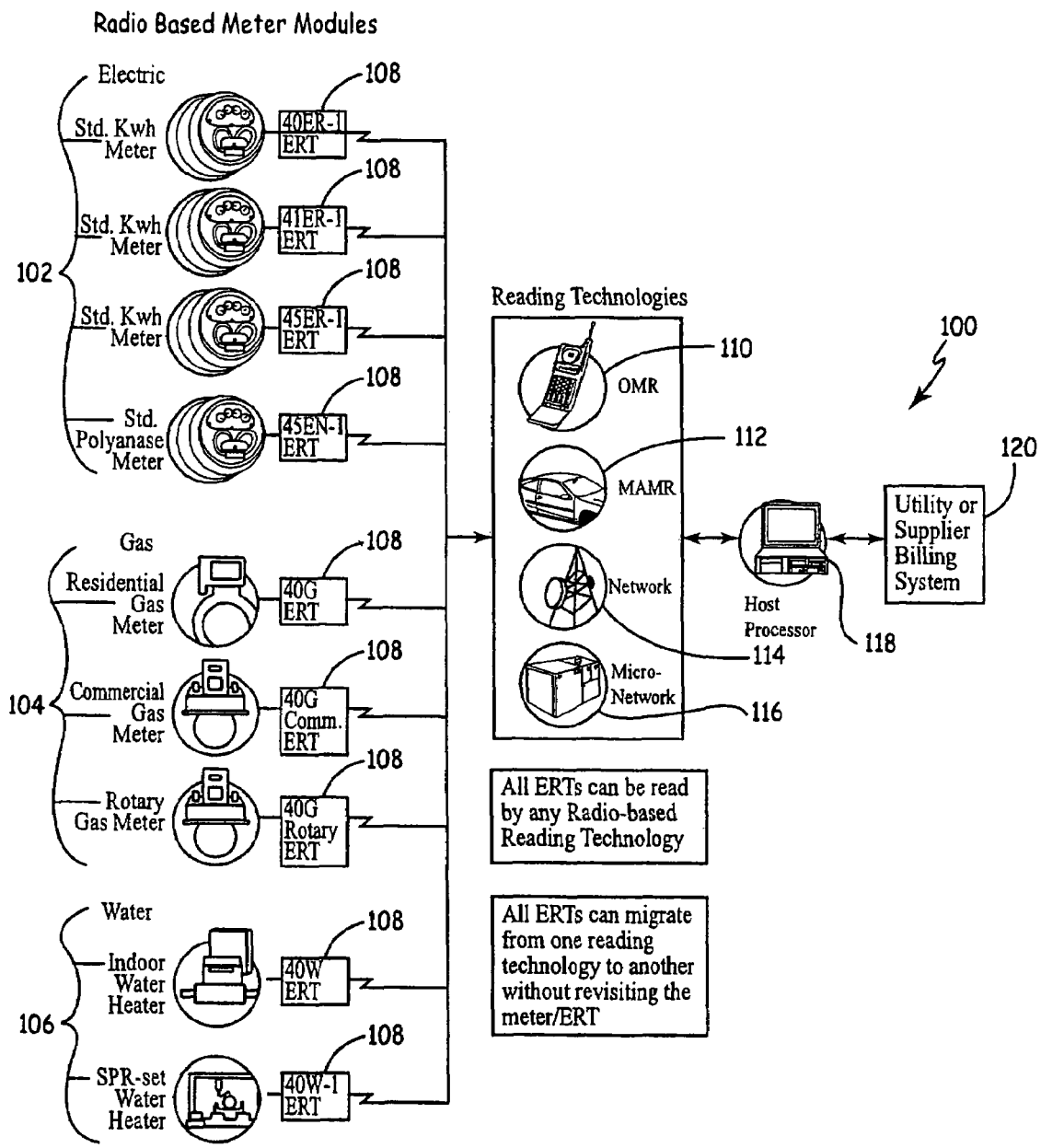
FIG. 1 depicts a radio-based automatic meter reading system that utilizes the data communication protocol of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

A first embodiment of the present invention is directed to a data communication protocol for automatic meter reading (AMR) systems. The protocol is designed to be flexible and expandable enabling both one-way and two-way meter reading in both fixed and mobile meter reading systems.

I. System Components

AMR system 100, as depicted in FIG. 1, that utilizes the invention includes at least one utility measurement device including, but not limited to, electric meters 102, gas meters 104 and water meters 106. Each of the meters may be either electrically or battery powered. The system further includes at least one endpoint 108, wherein each corresponds and interfaces to a meter. Each of the endpoints 108 preferably incorporates a radio frequency (RF) device, e.g., the Itron, Inc. ERT. The system additionally includes one or more readers that may be fixed or mobile, FIG. 1 depicts: (1) a mobile hand-held reader 110, such as that used in the Itron Off-site meter reading system; (2) a mobile vehicle-equipped reader 112, such as that used in the Itron Mobile AMR system; (3) a fixed radio communication network 114, such as the Itron Fixed Network AMR system that utilizes the additional components of cell central control units (CCUs) and network control nodes (NCNs); and (4) a fixed micro-network system, such as the Itron MicroNetwork AMR system that utilizes both radio communication through concentrators and telephone communications through PSTN. Of course other types of readers may be used without departing from the spirit or scope of the invention. Further included in AMR system 100 is a head-end, host processor 118 that incorporates software that manages the collection of metering data and facilitates the transfer of that data to a utility or supplier billing system 120.

Data collected by the endpoints 108 can be read via the AMR system by mobile readers 110, 112, or fixed radio communication network 114. Alternatively, data can be read and re-transmitted by the AMR system via an intermediate transmitter/receiver that extends the range of communication between a reader and endpoints 108. Regardless of how the endpoint data is read, each reader includes a transmitter, a receiver, an input component and a data storage component.

In AMR system 100, endpoints 108 can support one-way meter reading, 1.5-way meter reading, or two-way meter reading systems. In a one-way meter reading system, the reader listens to messages sent asynchronously from each endpoint. In such a system, endpoints do not need to receive any information from the reader. In a two-way meter reading system, endpoints listen for, and respond to prompting signals issued by the reader. Prompting signaling may include requests for utility meter consumption data, information about the endpoint's operational status or configuration settings, information about events that might have occurred (such as any outages), instructions to modify specified operating parameters, or the like. Therefore, a two-way meter reading system facilitates the AMR system reader's communicating with and optionally commanding the endpoint, while also facilitating the endpoint's responding to the reader's communications and commands. A 1.5-way meter reading system facilitates prompting endpoints to request data transmission by the endpoints, but avoids the additional complexity of command and control communications of two-way systems. In a 1.5-way system, the reader sends prompting signals to endpoints, which, in turn, listen for, and respond to the prompting signals by simply transmitting their collected data.

II. System Protocol

The present communication protocol will be described with reference to the 1430 MHz band that may be utilized within North America, however, it should be understood that any other radio frequency band may be used, as suitable, without departing from the spirit or scope of the invention. The present communication protocol will also be described with reference to the Open Systems Interconnection (OSI) protocol stack of the International Standards Organization which includes: (1) the physical layer; (2) the data link layer; (3) the network layer; (4) the transport layer; (5) the session layer; (6) the presentation layer; and (7) the application layer.

II.A. System Protocol—Physical Layer

The physical layer describes the physical characteristics of the communication. This layer conveys the bit stream through the network at the electrical and mechanical level. It provides the hardware means of sending and receiving data on a carrier. The physical layer specifications for the reader may be found in FIG. 2 wherein: (1) the operational modes; (2) the frequency band; (3) the channel bandwidth; (4) the modulation scheme; (5) the deviation; (6) the encoding; (7) the bit rate; (8) the frequency stability; (9) the minimum reception sensitivity; (10) the transmission power; (11) the preamble length; and (12) the transmission modes are provided.

The physical layer specification for the endpoint in a two-way AMR system, at a first data rate and a second data rate, are found in the tables of FIG. 3A and FIG. 3B, respectively. The specifications provided include: (1) the operational modes; (2) the frequency band; (3) the channel bandwidth; (4) the modulation scheme; (5) the deviation; (6) the encoding; (7) the bit rate; (8) the frequency stability; (9) the minimum reception sensitivity; (10) the minimum preamble length; and (11) the factory default frequency. The physical layer specification for the endpoint in a one-way AMR system is provided, similarly, in the table of FIG. 4. However, it should be understood that any other physical layer specifications may be used, as suitable, without departing from the spirit or scope of the invention.

II.B. System Protocol—Data Link Layer

Figure 5:
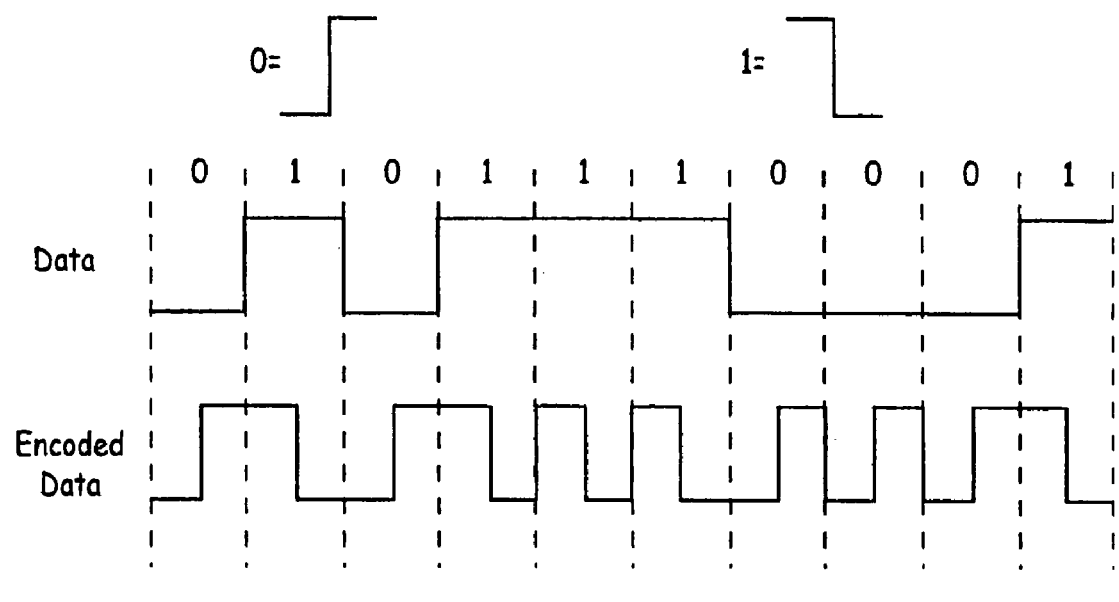
FIG. 5 is a diagram of a Manchester encoding structure.

The data link layer specifies how packets are transported over the physical layer, including the framing, i.e., the bit patterns that mark the start and end of packets. This layer provides synchronization for the physical level. It furnishes transmission protocol knowledge and management. In the present data communication protocol, all outbound data transmissions, i.e., all communications from the reader's central radio to endpoint, are Manchester encoded with the guaranteed transition mid-bit and each data bit encoded as $a_n a_n$ (bar). (See FIG. 5 for the Manchester Encoding Structure). Inbound transmissions from the endpoint are either transmitted as Manchester encoded data, identical to outbound transmissions, or are transmitted as NRZ (non-return to zero) data. Selection is based on the value of the MCH flag in the command and control frame.

The data link layer provides a countdown timer. The countdown timer uses Sequence Inversion Keying to represent timer bits. Each system is assigned a 10-bit pseudo noise (PN) sequence (for valid sequences, see Table 1 below). That sequence in the data stream represents a timer bit value 0 and the inverse of that sequence in the data stream represents a timer bit value 1. Timer values are composed of 10 timer bits, or 100 data bits. The countdown timer begins at 1023, or 1111111111 binary, and counts sequentially to zero, encoding all timer bits as either the system PN sequence or its inverse. The total counter time, in seconds, is 102400/r, where r is the bit rate, in bits per second. FIG. 6 provides an example of a Sequence Inversion Keyed Countdown Timer.

TABLE 1

PN Sequences

| Sequence Number | Usage | Sequence = 0 | Inverted Sequence = 1 |
|---|---|---|---|
| 0 | Factory Default | 0000000010 | 1111111101 |
| 1 | Electric Devices | 0000000110 | 1111111001 |
| 2 | Electric Devices | 0000001010 | 1111110101 |
| 3 | Electric Devices | 0000001110 | 1111110001 |
| 4 | Electric Devices | 0000011010 | 1111100101 |
| 5 | Electric Devices | 0000010110 | 1111101001 |
| 6 | Electric Devices | 0000111010 | 1111000101 |

TABLE 1-continued

| | PN Sequences | | |
|---|---|---|---|
| Sequence Number | Usage | Sequence = 0 | Inverted Sequence = 1 |
| 7 | Battery Devices | 0000101110 | 1111010001 |
| 8 | Battery Devices | 0001110110 | 1110001001 |
| 9 | Battery Devices | 0001101110 | 1110010001 |
| 10 | Battery Devices | 0000011110 | 1111100001 |
| 11 | Battery Devices | 0001011110 | 1110100001 |
| 12 | Battery Devices | 0001111010 | 1110000101 |

All inbound packet transmissions are preceded by a 24-bit or 25 bit preamble and appended with a 16-bit CRC code, which is inclusive of all header information, but not the preamble, length, or length_bar bytes. The CRC polynomial is 0×1021. The CRC initialization value is 0×0000. CRC processing is performed most significant byte (MSB) first, and the final checksum is not inverted.

II.C. System Protocol—Network Layer

The network layer specifies how packets get from the source network to the destination network. This layer handles the routing of the data (sending it in the right direction to the right destination on outgoing transmissions and receiving incoming transmissions at the packet level). The network layer does routing and forwarding. In the present data communication protocol, the network layer functionality is only implemented in electric endpoints, i.e., it is not used for battery-powered endpoints, or in any endpoint that acts as translator or repeater. This layer controls the hopping functions that need to occur between a reader and any endpoint in order to transfer data. This hopping protocol is currently used within the Itron AMR systems and is therefore not described in detail herein.

II.D. System Protocol—Transport Layer

The transport layer is used to solve problems like reliability ("did the data reach the destination?") and ensure that data arrives in the correct order. This layer manages the end-to-end control (for example, determining whether all packets have arrived) and error-checking. It ensures complete data transfer. In the present data communication protocol, slotting control is handled in the transport layer. This includes slot assignments, timing, and any necessary packetization. FIG. 7 details the packet structure. The message, message type, and flags are received from the presentation layer, and broken into appropriately sized packets. Each packet is prefaced with the endpoint ID, flags, message type, endpoint type, and packet length. The packet length reflects the number of bytes in the message itself, exclusive of header information. In the case where more than 254 bytes are required in a packet, the value of the length field is set to 0xFF, and the actual length of the message structure is placed in bytes 14 (high byte) and 15 (low byte), with the message bytes to follow. All packets must have a whole number of bytes in the message.

The packet number byte, when used as part of the message, is configured as below in Table 2, wherein the first four bits comprise the total number of packets in this message and the last four bits comprise the packet number.

TABLE 2

| | | | Packet Number | | | | |
|---|---|---|---|---|---|---|---|
| T MSB | T | T | T | N | N | N | N LSB |

The flags byte is configured as below in Table 3. The first two bits are reserved while the second two bits provides the encoder number (for multi-encoder units), wherein 00=encoder 0, 01=encoder 1, 10=encoder 2, and 11=encoder 3. The fifth bit signifies the status of a pending event, wherein 0=no pending event and 1=a pending event. The sixth bit comprises the security bit, wherein 0=security disabled and 1=security enable. The seventh bit comprises the relay bit, wherein 0=message from originating endpoint and 1=message via relay. The eighth bit comprises the resend bit, wherein 0=first attempt at packet transmission and 1=resend attempt.

TABLE 3

| | | | Flags | | | | |
|---|---|---|---|---|---|---|---|
| R MSB | R | ENC | ENC | EVT | SEC | RLY | RSD LSB |

Some endpoints in the system have the option of sending out an infrequent (several times a day) fixed format message at a higher power level, for use in 1-way fixed network applications. The message has its own structure, as defined in FIG. 8. The custom packet is then BCH (255, 139, 15) encoded, prior to transmission. The encoding polynomial is $0{\times}461407132060175561570722730247453567445_8$. For multi-encoder endpoints this packet is generated and sent for each individual encoder. The flags for the high power pulse data packet structure are configured as shown in Table 4 below. The first four bits are reserved while the fifth and sixth bits provide the encoder number, wherein 00=encoder 0, 01=encoder 1, 10=encoder 2, and 11=encoder 3. The seventh bit comprises the relay bit, wherein 0=message from originating endpoint and 1=message via relay. The eighth bit comprises the error code indicating that a critical endpoint error has occurred.

TABLE 4

| | | | Flags | | | | |
|---|---|---|---|---|---|---|---|
| R MSB | R | R | R | ENC | ENC | RLY | ERR LSB |

The endpoints may also be set to send out any preprogrammed message type in place of the fixed format message described above.

II.E. System Protocol—Session Layer

The session layer sets up, coordinates, and terminates conversations, exchanges, and dialogs between the applications at each end. It deals with session and connection coordination. In the present data communication protocol, the session layer generally comprises the command and control frame that is sent from the reader to the endpoint.

II.E.i. System Protocol—Session Layer/Two-Way Command and Control

The command and control frame is used to issue command to two-way endpoints either individually or in groups. It also serves to realign the endpoint real-time clock. FIG. 9A diagrams the two-way communication command and control frame. As shown, the command and control frame transmission is preceded by a 24-bit preamble, as indicated by the three "P" fields within the frame. The first 16 bits are preferably an alternating pattern, AAAAh, and are used for clock recovery. The last 8 bits are used for frame and timing synchronization.

Field "0" of the command and control frame comprises the system identification (ID). Each system is issued an 8-bit ID value, which is stored in the endpoint, to distinguish different systems within geographic proximity. The endpoints are designed to respond to commands from their own system or to commands that address them specifically by ID number, proper security password, and have a 0×00 in field "0". The system ID functions nearly identically to the cell ID, described below. However, the system ID is universal, while the cell ID is local, i.e., a single system will have multiple cells each having the same system ID but a different cell ID.

Field "1" of the command control frame comprises the frame ID. Each reader within the system is assigned a frame ID to use based on its position in the wake-up sequence. The position in the wakeup sequence is directly related to the frequency reuse pattern that is used in a given system. Table 1, described earlier, correlates the frame ID to the channel, which is correlated to the cell reuse ratio.

Field "2" of the command and control frame comprises the cell ID. Each cell is issued an 8-bit ID value, which is stored in the endpoint, to distinguish different systems within geographic proximity.

Fields "3" through "6" of the command and control frame is the RTC, which is defined as UTC time (coordinated universal time), which is a 32-bit value representing the number of seconds since midnight (00:00:00) on Jan. 1, 1970 GMT.

Field "7" is the command flags 1 field, wherein the first three bits define a slot length according to Table 5.

TABLE 5

Slot Lengths

| Value of Length Bits | Nominal Length in Ticks* | Nominal Length in ms |
|---|---|---|
| 000 | 819 | 24.99390 |
| 001 | 1638 | 49.98779 |
| 010 | 3277 | 100.00610 |
| 011 | 6553 | 199.98169 |
| 100 | 9830 | 299.98780 |
| 101 | 16384 | 500.00000 |
| 110 | 32768 | 1000.00000 |
| 111 | 163840 | 5000.00000 |

*Defined as ticks of an ideal 32,768 Hz clock.

The fourth bit is the forward error correction bit, wherein 0=no forward correction error and 1=forward error correct all responses. The fifth bit provides the slot mode, wherein 0=respond to command in pseudo-random slot (Slotted Aloha) and 1=respond to command in the defined slot. The sixth bit of field "7" defines the data type, wherein 0=NRZ response from endpoint and 1=Manchester encoded from the endpoint. The seventh and eighth bits of field "7" comprise the command target, wherein 00=the entire cell, 01=the group defined in EPID_HI (field "12"), 10=the group defined in EPID_LO (field "15"), and 11=the endpoint defined by EPID (including HI/LO), fields "12" through "15". It should be noted that in single endpoint communications the command target (TGT) is set to 11 and the endpoint responds immediately after command processing with a minimum of 25 milliseconds between this frame and the endpoint response.

Field "8" of the command and control frame is the command flags 2 field, wherein the first four bits are reserved. The fifth and sixth bits defined the encoder number, wherein 00=Encoder 0, 01=Encoder 1, 10=Encoder 2, and 11=Encoder 3. The final seventh and eighth bits define the transmit mode, wherein 00=transmit mode 1, e.g., mobile response required, 01=transmit mode 2, e.g., fixed network response required, and 10/11 are reserved. Also see section V below.

Field "9" of the command and control frame comprises the slot offset. Slot offset defines the number of slots between packets in multi-packet messages. For example, if the endpoint has an initial slot number of 50, and the slot offset is 120, a three-packet message would be transmitted in slots 50, 170, and 290.

Fields "10" and "11" of the command and control frame define the first unsolicited message. Specifically, they define the slot number where the unsolicited messages (UMs) are to begin. Any UMs generated during the cell read would be reported in a pseudo-randomly selected slot after the slot defined here. If the value of this field is 0×0000, no UMs are sent from the endpoint.

Fields "12" through "15" of the command and control frame provide the endpoint IDs for those endpoints that the reader is desiring to communicate with.

Fields "16" and "17" are the security fields and are described further in relation to the presentation layer.

Field "18", defines the command set. The commands are divided into two groups: (1) universal and (2) type-specific. Universal commands are numbered 0-63 and are applicable to all the system endpoints. Type specific commands are numbered 64-255 and vary depending on the lower nibble of the command set field in accordance with Table 6 below.

TABLE 6

Command Sets

| Command Set | CDS Value | Usage |
|---|---|---|
| 0 (default) | 0000 | Utility Metering Endpoints |
| 1 | 0001 | Repeaters and Translators |
| 2 | 0010 | Telemetry Devices |
| 3-14 | 0011-1110 | <<Reserved>> |
| 15 | 1111 | <<Reserved Engineering Use Only>> |

Fields "19" through "21" of the command and control frame define the command and command body. Specifically, the eight command bits of field "19" indicate the command type, wherein the numbers 0-63 are universal commands and 64-255 are the type specific commands. Fields "20" and "21" provide sixteen bits wherein any data needed to carry out the command type is provided. The tables in FIGS. 10 and 11 indicate the command types and command bodies that are possible with the system of the present invention. Referring to the universal commands (FIG. 10), it can be seen that the present system is capable of but not limited to: (1) reporting a status; (2) changing a system number to a new system number; (3) changing a group number to a new group number; (4) changing a system slot number to a new system slot number; (5) changing the cell ID to a new cell ID; (6) reporting slot numbers; (7) resending identified packets of data; (8) setting the receiver bubble-up period; (9) setting the bubble-up channel; (10) setting the bubble-up time; (11) configuring the transmission power; (12) setting the channel frequency; etc.

Referring to the type specific commands (FIG. 11), numerous other commands are available including but not limited to: (1) reporting consumption data; (2) reporting time of use (TOU) data; (3) reporting logged data; (4) reporting temperature; (5) reporting tamper data; (6) setting configuration flags; (7) initializing consumption; (8) reporting an event summary;

(9) performing an endpoint diagnostic check; (10) reporting memory contents; etc.

Fields "22" and "23" of the command and control frame designate the response frequency for the endpoint. The response frequency is configured as 16 bit flags, identifying valid response frequencies for the endpoint. For example, if the response frequency has a value of 0x00C1 (bits, 7, 6, and 0 are set), the endpoint may respond on channel, 7, channel 6, or channel 0.

endpoint receiver will always operate at 1427.000+(0.00625*480)=1430.000 MHz. This may be extended to other frequency bands. For example, the 433-435 MHz band is divided into 25 KHz frequency channels with the frequency channel 0 centered at 433.000 MHz, frequency channel 1 centered at 433.025 MHz and so on.

The command body of the set channel frequency command is detailed below in Table 8:

TABLE 8

Command Body/Channel Frequency

| CHN MSB | CHN | CHN | CHN | FRQ | FRQ | FRQ | FRQ | FRQ | FRQ | FRQ | FRQ | FRQ | FRQ | FRQ | FRQ LSB |
|---|---|---|---|---|---|---|---|---|---|---|---|---|---|---|---|

Field "24" is reserved for later use.

Field "25" indicates the length of the extended control frame in bytes. A value of 0 indicates that no extended frame is present.

Fields "26" and "27" of the command and control frame provides the cyclic redundancy check (CRC). Specifically, fields "26" and "27" provide a 16-bit CRC. The CRC is preferably a polynomial defined as 0x1021. The CRC initialization value is 0x0000. CRC processing is performed most significant bit (MSB) first, and the final checksum is not inverted.

II.E.ii. System Protocol—Session Layer/One-Way Command and Control

For simplicity one-way devices may opt to use the programming frame shown in FIG. 9B. The command and command body bytes are similar to that described above with reference to the two-way devices. The byte for number of commands provides the total number of commands to follow in this frame, with a maximum value of 8. The command flags are diagrammed in Table 7 below. The first two bits indicate the transmit mode, wherein 00=transmit mode 0, 01=transmit mode 1, and 10/11 are reserved. The third bit designates the data logging, wherein 0=data logging is disabled and 1=data logging is enabled. The fourth bit designates the forward error correction, wherein 0=disable forward error correction on response and 1=enable forward error correction on response. The fifth and sixth bits designate the mode set, wherein 00=stock mode, 01=test mode, 10=reserved mode, and 11=normal mode. The seventh and eighth bits are reserved.

TABLE 7

Command Flags

| TXM MSB | TXM | DLG | FEC | MDE | MDE | R | R LSB |
|---|---|---|---|---|---|---|---|

II.E.iii. System Protocol—Session Layer/Special Commands—Channel Frequency

Certain of the commands provided in the command and control frame are described in detail below. For instance, Command 33, which is the set channel frequency. Each of the system endpoints support up to 16 channels, which are set individually. They may or may not be contiguous channels. The channel numbering differs based on frequency band. For example, in the present implementation of the invention, the 1427-1432 MHz band is divided into 6.25 kHz frequency channels, with frequency channel 0 centered at 1427.000 MHz, frequency channel 1 centered at 1427.00625 MHz, etc. If endpoint channel 15 is programmed to a value of 480, that Individual frequencies are programmed into the endpoint by selecting the channel being programmed (1-15) with the top nibble, and the frequency number in the lower 12 bits. Endpoint channel 0 is preferably the manufacturing default frequency, and may not be edited. Endpoint channel 15 is the receiver frequency. It is initialized to the same frequency as channel 0 at manufacture, and is preferably programmed prior to or at installation. The endpoint channel uses are defined in Table 9 below:

TABLE 9

Endpoint Channel Use

| Endpoint Channel | Channel Use |
|---|---|
| 0 | Factory Default. This channel is not reprogrammable. |
| 1 | General use Tx/Rx (Transmission/Reception) |
| 2 | General use Tx/Rx |
| 3 | General use Tx/Rx |
| 4 | General use Tx/Rx |
| 5 | General use Tx/Rx |
| 6 | General use Tx/Rx |
| 7 | General use Tx/Rx |
| 8 | General use Tx/Rx |
| 9 | General use Tx/Rx |
| 10 | General use Tx/Rx |
| 11 | General use Tx/Rx |
| 12 | General use Tx/Rx |
| 13 | General use Tx/Rx |
| 14 | Default UM Channel (unsolicited message) |
| 15 | Default Rx Channel |

The configuration flag commands, i.e., commands 90, 91, and 92 are used for setting individual flags in the endpoints. Each flag command includes an 8-bit flag mask and an 8-bit flag as shown below (the configuration flags 1 command body):

TABLE 10

Flag Mask

| MSK MSB | MSK | MSK | MSK | MSK | MSK | MSK | MSK LSB |
|---|---|---|---|---|---|---|---|

TABLE 11

Flags

| R | R | R | TxB | UMC | FN | FEC | MMI |
|---|---|---|---|---|---|---|---|

The flag mask field determines which flags are to be modified by this command. A "1" in any bit position means the associated value in the flags field should be modified. For example, A value of 0×17 (bits 4,2,1 and 0 are high) means that the values in the Flags field, bits 4, 2, 1, and 0 must be written to the associated flags in the endpoint. With regard to the flags field of Table 7, the first three bits are reserved for future growth while the fourth bit, TxB, determines if the endpoint is in transmit bubble up mode, the fifth bit, UMC, defines the unsolicited message channel, i.e., UMC=0 then transmit UMs on Channel 14, and UMC=1 then transmit UMs on channel 15. The sixth bit of the flags field defines the fixed network mode, wherein 0=this endpoint operates in Mobile/Handheld mode only and 1=this endpoint operates in mobile/handheld/fixed network mode. The seventh bit of the flags field defines the forward error correction, wherein 0=no forward error correction applied to the high power pulse and 1=forward error correction is applied to the high power pulse. The eighth bit of the flags field defines the multiple message integration, wherein 0=no multiple message integration applied to high power pulse and 1=multiple message integration applied to high power pulse.

II.E.iv. System Protocol—Session Layer/Special Commands—Test Commands

The present data communication protocol provides at least two commands for use in system testing and analysis. The first command is command 210, i.e., Generate UM (unsolicited message). This command automatically generates an unsolicited message in all endpoints addressed by the command and control frame. It generates the lowest numbered UM supported by the endpoint. The second command is command 211, i.e., Enter Screaming Viking Mode. Screaming Viking Mode is a constant transmission mode, to be used for test only. When this command is received, the endpoint repetitively transmits its ID for the number of minutes declared in the command. If a value of 0 is sent, the mode is active for 15 seconds.

II.E.v. System Protocol—Session Layer/Special Commands—Extension Commands

Commands 48, 49, 50 and 51 of the data communication protocol are implemented as extensions to the command and control frame. The extension commands immediately follow the command and control frame in the same transmit session. Command 48 is the multiple ungrouped endpoint command. In the case where the system needs to command a group of specific endpoints and vector them to specific slots, command 48 is issued. The central radio then issues commands to these endpoints, as shown in FIG. 12. This command can be used to address a maximum of 16 distinct endpoints. The packet length reflects the number of endpoints addressed by the message. Note that the command 48 may not be used for any command that requires the security password. The structure of command 48 provides for an 8-byte preamble having the value of 0×AAAA AAAA AAAA AA96, the length, the endpoint IDs, and the command bodies for each of the endpoints and a response byte for each of the endpoints. The response byte is diagrammed in Table 12 below:

TABLE 12

| Response Byte | | | | | | | |
|---|---|---|---|---|---|---|---|
| R MSB | R | R | R | CHN | CHN | CHN | CHN LSB |

The response byte reserves the first four bits and utilizes the last four bits to define the response frequency nibble. Specifically, the four bit flags define which of the pre-programmed channels the endpoint may respond on. If CHN=0000, then use the response frequency byte from the original command and control frame. The structure of the command 48 also includes the CRC as described earlier.

Command 49, i.e., the vector and listen frame, is issued in the instance where the central radio or reader need to download an arbitrary block of data to the endpoint. The endpoint, upon receiving this command receives a data frame, as defined in FIG. 13. This command is valid only when the endpoints are individually addressed (i.e., TGT=11). The data is endpoint-type specific. Note that the vector and listen frame has an 8-byte preamble with a value of 0×AAAA AAAA AAAA AA96. Further, note that the packet length reflects the number of bytes in the message itself, exclusive of header information, and that the CRCs computed over all bytes in the message body.

Command 50, the multiple command to individual endpoint command, is used in the case where the central radio or reader need to download a series of commands to one specific endpoint. The endpoint, upon receiving this command, receives a data frame as defined in FIG. 14. This command is only valid when the endpoints are individually addressed (i.e., TGT=11). Up to 24 commands may be issued to an endpoint using this structure. Note that the packet length reflects the number of commands to be issued within this structure.

Command 51, the Extended Frame Mobile Read command, uses the multiple ungrouped endpoint command structure, with a Slotted-ALOHA period between the extended frame and the queried response slots. All endpoints which recognize the command respond. If the endpoint is among those addressed by the extended frame, it responds as commanded, being offset by 16 slots. If the endpoint is not specifically addressed it responds in the Slotted-ALOHA section with its programmed default message.

II.F. System Protocol—Presentation Layer

The presentation layer, which is usually part of an operating system, converts incoming and outgoing data from one presentation format to another and it is sometimes called the syntax layer. In the present data communication protocol, the presentation layer handles data security and any necessary data compression and decompression.

The data security is preferably a simple two-level protocol, which may be enabled or disabled by the customer. Level 1 provides simple encryption for the transfer of normal data while level 2 provides write security to the endpoint to prevent unauthorized users from changing endpoint parameters.

Level 1 is intended for use on ordinary data being transmitted from the endpoint to the head end. All data is encrypted with a simple 8-bit XOR mask. The level 1 security enables flag and encryption mask and are editable by a level 2 parameter write. The factory default for the XOR mask is the bottom 8 bits of the serial number. Level 1 security is applied only to the message itself and not to the EPID, flags, or message type. Level 1 security may be disabled by setting the mask value to 0.

Level 2 security is intended for use on any head end commands to change endpoint parameters. It includes modification of operational, security and reprogramming parameters. Level 2 functionality is independent and can be applied with or without Level 1 functions enabled. Each endpoint has a 16-bit password. This password is originally defined at install, and can be edited by a valid Level 2 command. Any write command must include the current password to be considered valid by the endpoint. For added security, the Level 1 encryption mask may be applied to the password, if Level 1 functionality is active. There is no compression performed on packet data.

II.G. System Protocol—Application Layer

The application layer is the layer at which communication partners are identified, quality of service is identified, user authentication and privacy are considered, and any constraints on data syntax are identified. (This layer is not the application itself, although some applications may perform application layer functions.) In the present data communication protocol, an endpoint application layer is used in conjunction with the application programming interface (API). When data is requested by the presentation layer, via the API, the application layer performs its processing and returns the requested message as a single block, along with one 8-bit value. The value represents the message type.

III. System Operation

The two-way AMR system of the present invention, at 1430 MHz, is designed to operate most efficiently in five contiguous RF channels. This allows the use of a cheaper (wider) receiver section in the endpoint while still maintaining the FCC mandated 50 KHz maximum transmit spectrum. The transmit spectrum in all devices, endpoints, and readers, must maintain a 50 KHz or less occupied bandwidth during transmit. The receiver in the reader must also have a good selectivity on the channel of interest. The endpoint receiver is allowed to accept a wider receive bandwidth primarily to reduce the cost of the endpoint.

Figure 15:
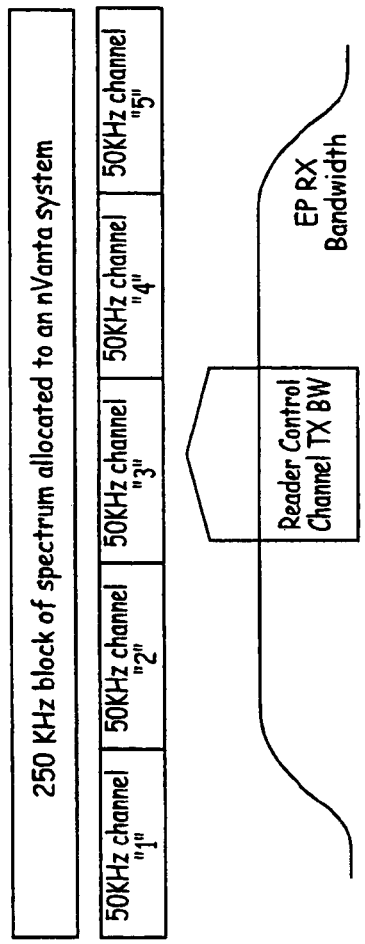
FIG. 15 is a diagram of the channel spectrum of the system.

Refer to FIG. 15 to observe the 250 KHz of spectrum allocated to the system. As shown, the spectrum is divided in to five 50 KHz channels. The center channel, i.e., channel 3, is designated as the control channel for the system 100. All endpoints 106 listen on this channel. As such, if the readers are quasi-synchronized in their outbound transmissions the center channel approach allows the endpoints to use a wider receive bandwidth while avoiding the interference that would normally be a problem (synchronization is described in further detail below). The diagram of FIG. 15, illustrates the bandwidth differences graphically. Since the reader has good selectivity the endpoints can respond on a different channel in each cell simultaneously allowing the maximum data throughput in the system (cell re-use is described in further detail below).

By utilizing an appropriate RF ASIC, the architecture can be reduced to three contiguous channels with the reaming two or more channels scattered throughout the band to ease spectrum allocation requirements. With a reduction in the interference protection to the end point, a completely separated channel model could be used in an alternative configuration. However, in the separate channel model, the endpoint requires additional base band filtering and is still slightly more susceptible to adjacent channel interference on the control channel especially if operating in the high power portion of the band. The separate channel option also allows multiple control channels in the system when mobile operation is used with multiple outbound channels. When using the separate channel model, channels 2 and 4, of a 5-channel block, are used for control signals.

To alleviate cell-to-cell interference in a system with a single control channel the readers must be synchronized in time so that the control frames, which are described in further detail below, do not overlap. The addition of "dead time" in between sequential control frames allow for the receivers to be quasi-synchronized instead of in perfect lock step. In the preferred embodiment, quasi-synchronized means that the receivers are within 0.5 seconds of each other, which can easily by achieved via protocols such as NTP (network time protocol). Other quasi-synchronization times may be used without departing from the spirit or scope of the invention. As such, a GPS or other high accuracy time base is not required within the readers.

Figure 16:
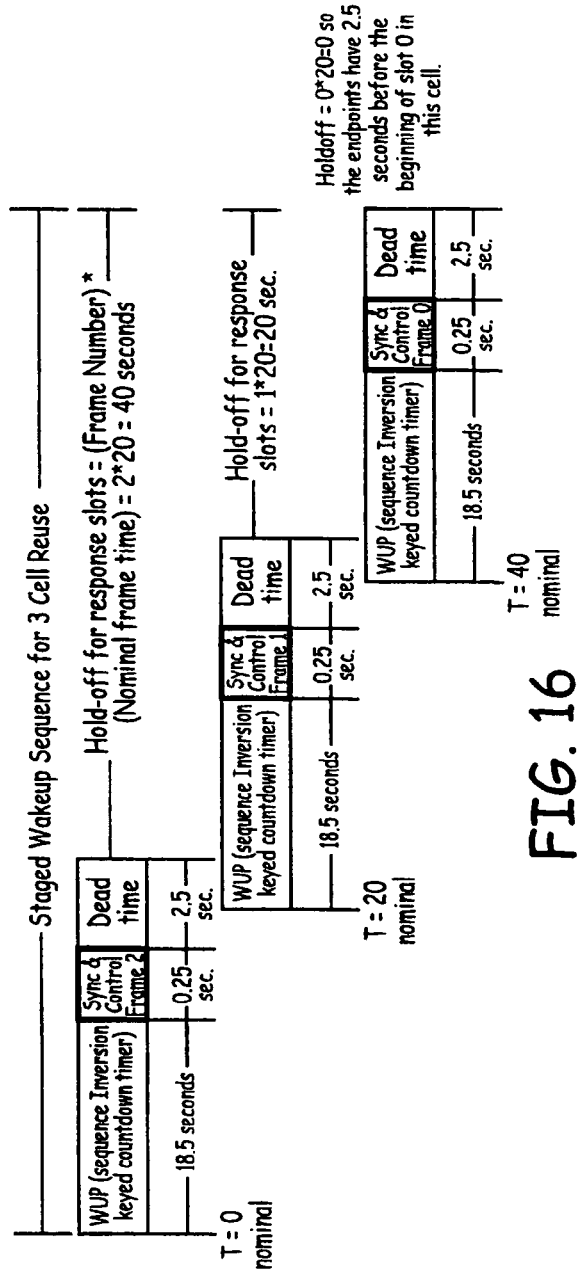
FIG. 16 is example of a timing diagram for a staged wakeup sequence for a three cell reuse pattern.

Within the AMR system, each reader is assigned a frame ID to use based on its position in a wakeup sequence. The position in the wakeup sequence is directly related to the frequency reuse pattern used in a given system. The timings in the diagram of FIG. 16 are provided as an example of a staged wakeup sequence for three cell reuse. As shown, the timings are for an endpoint to endpoint clock accuracy of +/−0.5 seconds, if the value obtainable is only +/−1 second then the dead time must be increased to 5 and the nominal frame time to 22.5 seconds. All other timings remain the same. If GPS is available in the reader, the dead time can be reduced and the time frame timing can be shortened. In any case, the minimum dead time is preferably 0.5 seconds.

As shown in FIG. 16, the first wake-up sequence is initiated at time T=0. For the first 18.5 seconds, get wakeup (SIK countdown timer), next 0.25 seconds (command and control, frame 2), and last 2.5 second is dead time. The remaining time in the timeline is the hold off time for response slots, which is the frame number*the nominal frame time, or 2*20=40 seconds of hold off time. At T=20, the second wake-up sequence is initiated. Similarly, the first 18.5 seconds, get wakeup (SIK countdown timer), next 0.25 seconds (command and control, frame 1), and the last 2.5 seconds is dead time. The hold off time for response slots in this instance is, again, the frame number*the nominal frame time, which is 1*20=20 seconds off hold off time. At T=40, the third wake-up sequence is initiated. For the first 18.5 seconds, get wakeup (SIK countdown time), the next 0.25 seconds (command and control, frame 0), and the last 2.5 seconds is dead time. The hold off time for response is calculated as follows, frame number*nominal frame time, or 0*20=0 seconds hold off time meaning the endpoints have 2.5 seconds before the beginning of slot 0 in this cell.

As mentioned, the example of FIG. 16 is for a three cell reuse pattern. However, the example can be easily extended to higher cellular reuse ratios by adding more frames as appropriate. In the 1430 MHz system, the maximum recommended cellular reuse is 5. This leads to a hold off time of 100 seconds in the first cell transmitted which is short enough for the endpoint to maintain accurate timing with regard to slot timings.

Unless otherwise specified by the system, the frame ID is preferably tied to the cellular frequency used based on Table 13 below:

TABLE 13

| Cell Reuse Ratio | Frame ID Channel to Frame ID mapping |
|---|---|
| 3 Cell | Channel 1 = Frame ID 0 |
|  | Channel 3 = Frame ID 1 |
|  | Channel 5 = Frame ID 2 |
| 4 Cell | Channel 1 = Frame ID 0 |
|  | Channel 2 = Frame ID 1 |
|  | Channel 4 = Frame ID 2 |
|  | Channel 5 = Frame ID 3 |
| 5 Cell | Channel 1 = Frame ID 0 |
|  | Channel 2 = Frame ID 1 |
|  | Channel 3 = Frame ID 2 |
|  | Channel 4 = Frame ID 3 |
|  | Channel 5 = Frame ID 4 |

Figure 17:
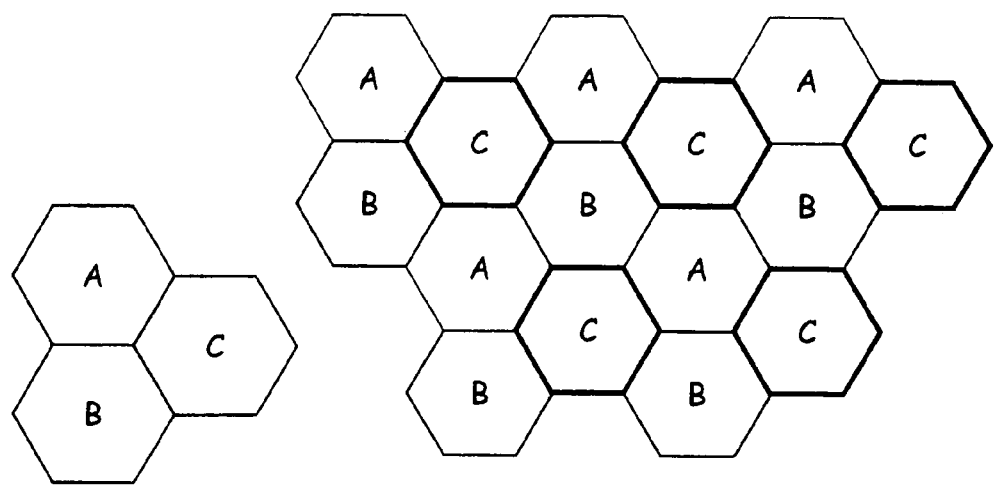
FIG. 17 is an example of a three-cell cellular reuse pattern.
Figure 18:
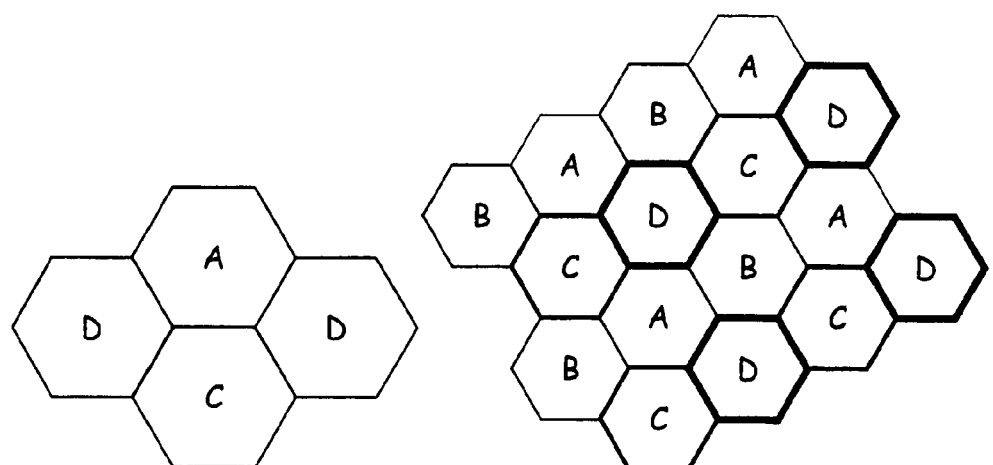
FIG. 18 is an example of a four-cell cellular reuse pattern.

To maximize throughput in the system 100, a cellular reuse scheme is employed in the 1430 MHz band. The reuse ratio is preferably a 3, 4, 5, 7, or 9 cell pattern. Smaller patterns are preferred from a delay perspective, however, the final choice is preferably made during the RF planning and installation of actual systems in the field. The 7 and 9 patterns are preferably used in the virtual cell model. The reuse patterns are provided in FIGS. 17, 18, and 19 depicting three-cell (ABC), four-cell (ABCD), and five-cell reuse patterns (ABCDE), respectively.

IV. Mobile and Hand-Held Operation

When operating in the mobile or hand-held mode, the 2.5 seconds of "dead time" does not apply. Rather slot "0" occurs at the end of the command and control frame plus 25 milliseconds. Note, that due to time required to read the attached meter and/or bring the charge pump to full operation the endpoint may or may not respond in slot "0" even if told to respond immediately.

In programming mode, the hand-held control may reduce its sensitivity by as much as 30 dB to avoid overload conditions at close programming distances. The hand-held and endpoint must work with programming distances as close as 0.5 meters and as far as 300 meters when in the mobile mode of operation with a line of site propagation path.

In mobile operation the wake-up sequence, the command & control data, and the receive portions of a standard read cycle are continuously repeated as the mobile moves through the system. The timing is preferably in the range of a one to five second cycle. The diagram depicted in FIG. 20 gives a general over view of the mobile operation over the five channels.

The command & control frame preferably contains a group call read that solicits a consumptive type reading from all of the endpoints that can hear the mobile and that have the correct system ID. The endpoint responds to the group call in a random slot, on a random channel. The random channel is chosen from the list of available channels that is provided in the command & control frame. The random slot is one of the 50 ms slots in the Slotted-ALOHA portion of the frame. (Slotted ALOHA is a random access scheme just like regular ALOHA except that the transmissions are required to begin and end within the predefined timeslot. The timeslots are marked from the end of the command & control frame just like in the fixed network).

When the reader hears a response from a given endpoint, it knows that it is within range and can request a specific response from the endpoint in the next command & control frame. The command & control frame is expected to contain both a standard command frame and an extended control frame to allow for the mobile to access the most endpoints possible in a single pass. When the mobile requests a response from the end point it will tell it the channel and time slot that it is supposed to respond on. This is to minimize the chances of a collision on the longer messages that can be delivered in the MDP type of responses. During the mobile cycle, battery endpoints may be required to bubble up their receivers up at a higher rate than normal or synchronize to the first command & control frame to improve mobile performance.

If the van is moving at a maximum of 30 miles per hour it will travel 440 feet in 10 seconds. The van will also have a communications radius of approximately 500 feet give a 1400 MHz system operating at a data rate of 22.6 Kchips/second, with the expected power levels and receiver sensitivities (e.g., +14 dBm endpoint TX power, −110 dBM RX sensitivity in the van, 20 dB margin, endpoint at 5'). The margin is included because the MDP data packet is much longer than the current SCM type messages and is not repeated unless an error occurs. To achieve a low re-try rate, it is desirable to bring the BER down to 0.01%. To do this under normal situations would require an additional 20 dB of margin, however, a diversity setup on the van receivers can be used to achieve the same results. This requires two antennas on the van placed five to six feet apart along with an additional receiver demodulator chain per channel. For SCM data that is repeated multiple times, the system can operate at a much lower margin and still achieve excellent read reliability in the van. A coverage radius of about 1200 feet is obtained for the system when collecting standard consumptive data.

Figure 21:
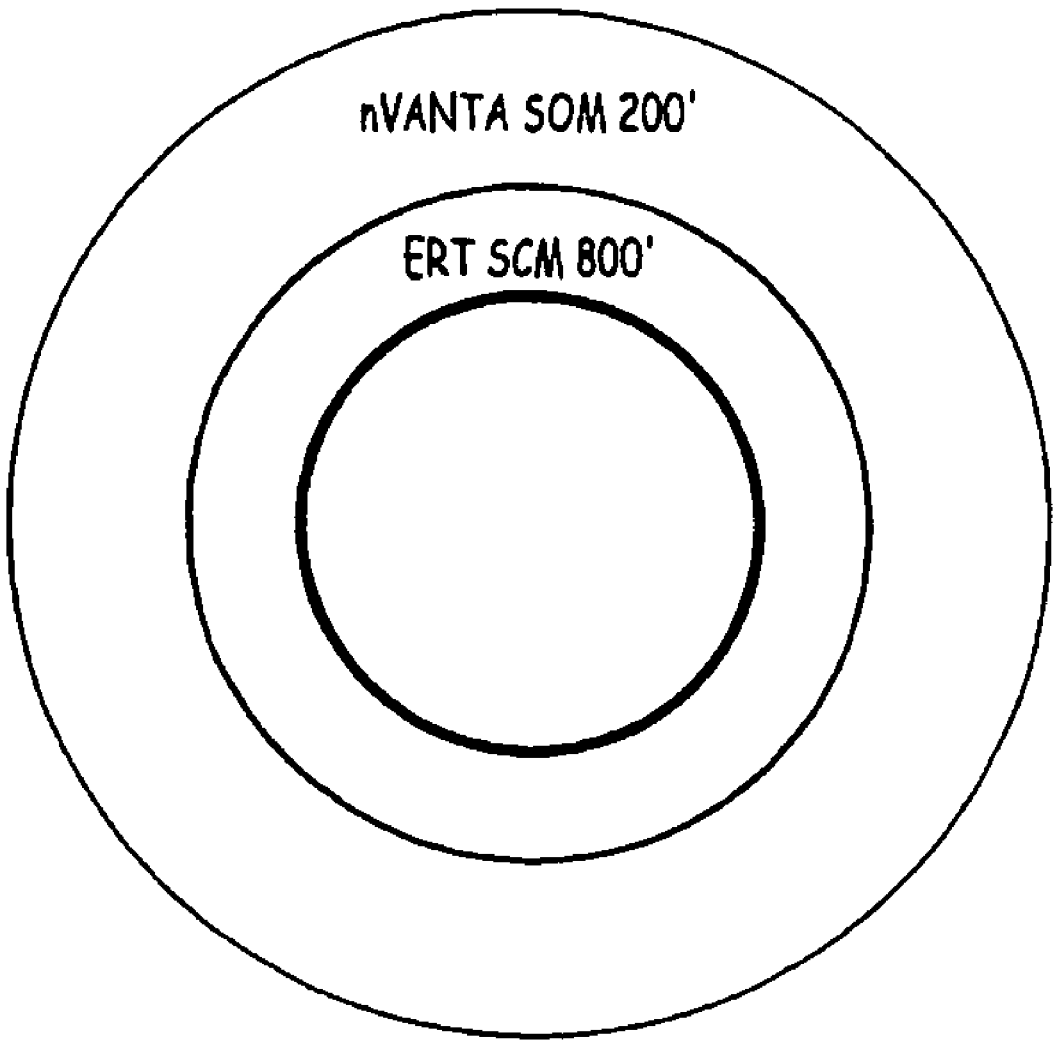
FIG. 21 depicts coverage rings.

The diagram of FIG. 21, shows the coverage rings for low margin SCM messages and for the 20 dB margin IDR messages for the present system in comparison with the current 0 dB margin SCM messages from the ERT.

With the current mobile protocol each endpoint is, on average, in the range of the van for approximately 12 to 25 seconds. This is an appropriate amount of time to wake up the endpoint, identify who it is, request an MDP (mobile data packet=250 bytes of raw data maximum) to be sent, receive the MDP and potentially retry the request and receive portions of the process if necessary.

In the basic system, there are five channels at a maximum 75% utilization for MDP responses. This gives an effective data rate of 42375 BPS or 5296 bytes per second or 21 blocks per second. Since the system is looking at a single block per meter, the system can support 21 new meters per second. The mobile then has a nominal range of 500 feet. This gives the system of about 175 meters in range at any given time, even in the densest specified systems. If the van is moving at 30 mph, the system gets 44 feet of new meters per second. In performing a geometric approximation, the result is about 12 new meters per second. So, the system can handle 21 new meters per second but can only get in the range of 10 to 12 meters per second. This allows for a full set of retries in a dense system. (This assumes the low 11.36363 KBPS data rate and the full 250 byte MDP, for smaller packets and with the higher data rate option, the situation is even better.

V. Response Optimization for Mobile and Fixed Network Operation

In order to optimize the batter efficiency, range, and overall system robustness for endpoints that must operate in both a mobile and fixed network scenario without reprogramming, the following methodology is preferably used. The outbound transmission from the reader includes a flag that states the response mode of the endpoint. When the response mode flag is set to "mobile" the endpoint responds at a lower power (e.g., +14 dBm) and in a dynamically randomized slot determined as described above. When the endpoint sees the "fixed network" flag set it responds in its assigned slot at high power (e.g., +30 dBm). The advantage provided by this scenario is that in the mobile case the reader is not burdened with slot dynamic allocation of multiple, which can be computationally intensive and consume additional air time to successfully communicate to all the in-range endpoints. It also allows the endpoint to conserver power and reduce interference. This leads to the ability to transmit more data with less retries. In the fixed network case, the high power mode enables the system to get maximum range from the device (reducing infrastructure costs) while interference is mitigated by assigned slots. The slots are efficiently assigned in the fixed network case because of the pseudo-static nature of the system. Note that prior art systems enabled only static programming of the endpoint to operate in one mode or the other. As such, the previous methodology did not allow for mixed mode operation without reprogramming the endpoint. Thus, the present invention presents the combination of low power operation and dynamic slot assignment for mobile operation with the high power slotted operation for the fixed network all controlled by a flag in the outbound wakeup data. Refer to field "8," bits 7 and 8, of the command & control frame that define the transmit/response mode.

An alternate embodiment of the present invention is generally directed to an operating mode for devices that work with automatic meter reading (AMR) systems. In one example application, a bubble-up operating mode according to one embodiment of the present invention is implemented in utility meter endpoint devices that are a part of an AMR system. While the invention is not necessarily limited to such an application, the invention will be better appreciated using a discussion of example embodiments in such a specific context.

Figure 22:
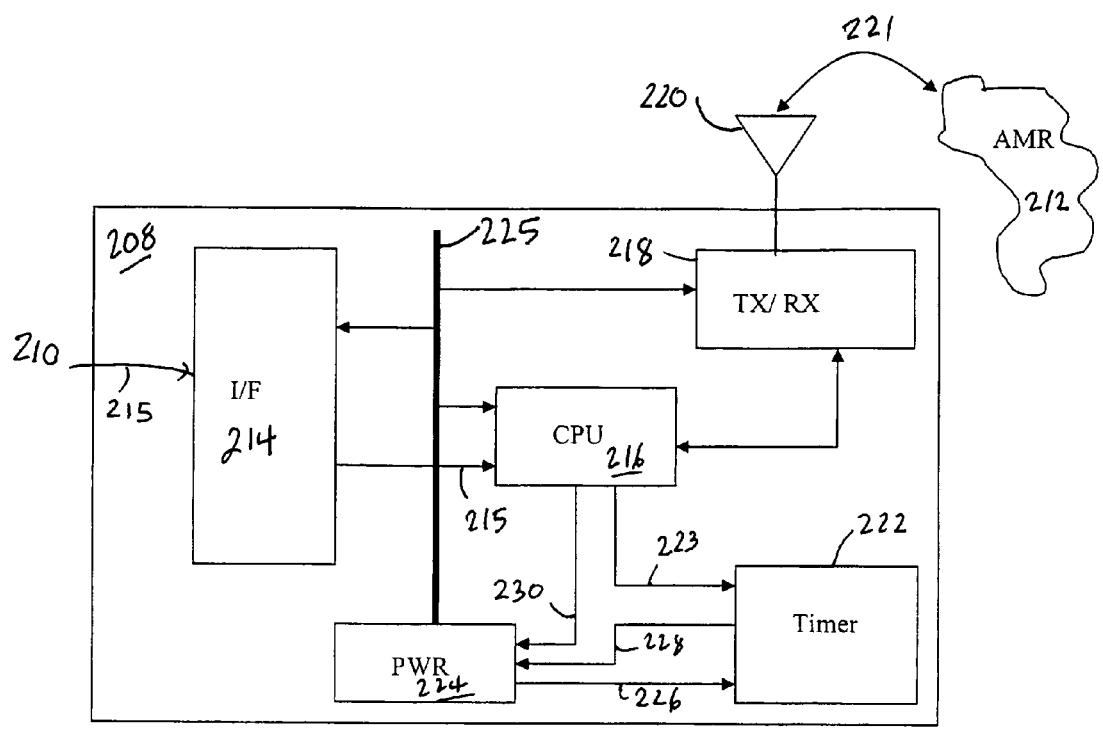
FIG. 22 is a diagram illustrating an example embodiment of a utility meter endpoint adapted to communicate wirelessly with an AMR system.
Figure 23:
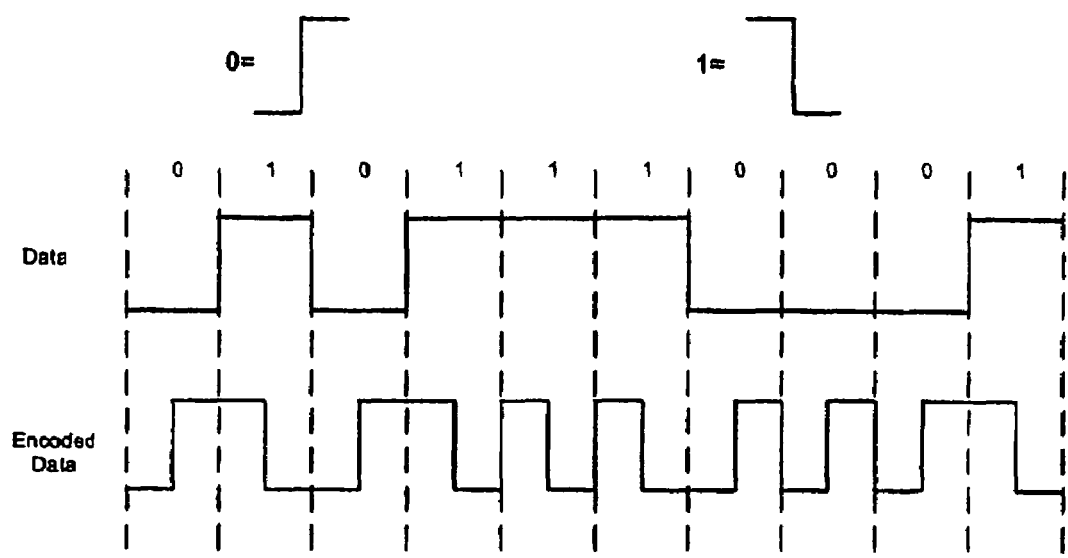
FIG. 23 is a diagram illustrating a Manchester encoding scheme or sequence.

FIG. 22 illustrates one example embodiment of a utility meter endpoint 208. Endpoint 208 interfaces with a utility meter 210, receives consumption, utility meter status, history, and other such relevant data from utility meter 210, and communicates the data to AMR system 212. Endpoint 208 includes an interface system 214, which operatively couples to utility meter 210 via coupling 215. In one embodiment, coupling 215 includes electrical and mechanical components for making a physical and electrical connection between utility meter 210 and endpoint 208. For example, coupling 215 can include electrical connectors and conductors that carry electrical signals from utility meter 210 to interface hardware in interface system 208 that converts the electrical signals into a digital representation that is readable by CPU 216. Interface system 214 is, itself, interfaced with CPU 216 via interface 215. In one embodiment, interface 215 includes a portion of a data bus and of an address bus.

CPU 216 is a controller that oversees operation of endpoint 208. In one embodiment, CPU 216 includes a microprocessor system that has memory, instruction processing, and input/output circuits. CPU 216 interfaces with radio transceiver 218 via interface 217. In one embodiment, interface 217 includes a portion of a data bus and of an address bus, which is coupled to an antenna 220. In operation, interface hardware 214 forwards and converts utility meter data to CPU 216. CPU 216 processes, and stores the data at least temporarily, and instructs transceiver 218 to communicate the data to AMR system 212 at appropriate or preprogrammed/predefined times.

Endpoint 208 operates in a low-power standby mode during a majority (>50%) of the time. While in the standby mode, interface system 214, CPU 216, and transceiver 218 are effectively shut down so that they consume at most a negligible amount of power. Timer 222 operates to periodically wake up the shut-down systems so that they enter into an active operating mode. In one embodiment, timer 222 is an independent circuit that is interfaced with CPU 216. In another embodiment, timer 222 is implemented as a watchdog timer in a microcontroller that is a part of CPU 216. In either embodiment, one feature of timer 222 is that timer 222 consumes relatively little energy for operating. Also, upon expiration of a time duration set into timer 222, timer 222 provides a signal that initiates bringing online the systems that are in standby mode. In a related embodiment, the settable time duration is set in timer 222 by CPU 216 via setup signal 223. For example, setup signal 223 can be carried via a data bus.

According to one example embodiment, endpoint 208 includes a power supply 224. In this embodiment, power supply 224 includes one or more batteries. Power supply 224 provides conditioned power to interface system 214, CPU 216, and transceiver 218 via switchable power bus 225. Power supply 224 provides conditioned power to timer 222 via power line 226. Timer 222 provides a control signal 228 to power supply 224 that causes power supply 224 to apply power to power bus 225. CPU 216 provides a control signal 230 to power supply 224 that causes power supply 224 to remove power from power bus 225. In operation, beginning in a standby mode, timer 222 has been configured with a set time duration by CPU 216 via setup signal 223. Timer 222 monitors the passing of the time duration and, at the expiration of the time duration, timer 222 provides a signal to power supply 224 to energize power bus 225. Once power is applied via power bus 225 to CPU 216, interface system 214, and transceiver 218, CPU 216 begins executing a program that gathers data from utility meter 210 via interface system 214, and momentarily activates transceiver 218. Once the program is complete, CPU 216 sets a time duration into timer 222 and initiates timing, and generates control signal 230 to power down the systems that have been powered via power bus 225.

The momentary operation cycle described above is one example of endpoint activity in response to a bubble-up event. A bubble-up event is herein defined as a condition to which an endpoint responds by exiting a low-power standby operating mode or state, and enters a more active operating mode or state for the purpose of engaging in data communications. One example of a bubble-up event is the passage of a predefined period of time since the previous bubble-up event. Another example of a bubble-up event is an occurrence of a predefined date and time at which a communication cycle has been scheduled to take place. In one example embodiment of endpoint 208, in response to each bubble-up event, transceiver 218 operates in a one-way communications mode, in which it simply transmits the utility meter data via RF communication 221. To support this example one-way communication, the reader operates continuously in a mode receptive to transmissions by endpoints.

Two-way and 1.5-way endpoints can also respond to bubble-up events by entering into a temporary receptive operating mode for a predefined duration of time. For example, in one embodiment, if transceiver 218 detects any incoming communications via the AMR system during the time duration, transceiver 218 signals CPU 216. CPU 216 then determines whether to respond to the received signal. In one embodiment of a two-way endpoint, CPU 216 is programmed to listen for further instructions from AMR system 212 when CPU 216 determines that communications have been directed at endpoint 208. The further instructions could request particular information such as utility meter consumption data transmission from endpoint 208, in which case endpoint 208 will transmit such data. Alternatively, the further instructions could request a configuration change in endpoint 208, in which case CPU 216 will institute the requested change if such a change is permitted. In this example embodiment, AMR system 212 can communicate any number of instructions, such as configuration changes, requests for data transmission, or the like, to endpoint 208. In turn, endpoint 208 responds to any such received instructions according to its operating program.

In one embodiment of a 1.5-way endpoint, CPU 216 is programmed to cause the endpoint 208 to transmit a predefined set of data, such as, for example, utility consumption data, during a specified time slot in response to a received signal determined to be directed to the endpoint. In this manner, the example 1.5-way endpoint avoids the extra processing, receiving, and associated energy consumption needed to support a two-way communication protocol.

Detection of Inbound Communications

A two-way or 1.5-way endpoint can detect inbound RF communications using a variety of known techniques. In one embodiment of endpoint 208, a digital squelch scheme is utilized to perform a threshold detection of a potential radio communication. In this type of embodiment, endpoint 208 measures a bit rate of on-air radio communications within the receiver bandwidth of transceiver 218. If the bit rate is detected within a valid range, endpoint 208 proceeds to monitor a predetermined number of subsequent bits to assess whether the on-air communications are in fact directed to endpoint 208. Embodiments of a digital squelch scheme are disclosed in U.S. patent application Ser. No. 10/931,945, filed Sep. 1, 2004, and entitled, "SYSTEM AND METHOD FOR FAST DETECTION OF SPECIFIC ON-AIR DATA RATE," the entirety of which is incorporated herein by reference.

In a related embodiment, endpoint 208 performs a further assessment of an incoming communication by detecting a presence of a pre-assigned communication initiation signal. When the communication initiation signal includes one or more predefined sequences known by CPU 216, endpoint 208 responds according to its operating program and response mode.

In one example embodiment, a communications initiation signal utilizes one or more pseudo noise (PN) sequences. The use of PN sequences permits endpoint 208 to use a relatively lightweight demodulation scheme to detect the presence of an AMR system 212 message intended for endpoint 208. Receipt by CPU 216 of a known PN sequence is indicative that an information-bearing message is being transmitted or will be transmitted shortly. Table 14 below lists a set of example PN sequences having a sequence length of 10 bits.

TABLE 14

Example PN Sequences

| Sequence Number | Usage | Sequence = 0 | Inverted Sequence = 1 |
|---|---|---|---|
| 0 | Factory Default | 0000000010 | 1111111101 |
| 1 | Electric Devices | 0000000110 | 1111111001 |
| 2 | Electric Devices | 0000001010 | 1111110101 |
| 3 | Electric Devices | 0000001110 | 1111110001 |
| 4 | Electric Devices | 0000011010 | 1111100101 |
| 5 | Electric Devices | 0000010110 | 1111101001 |
| 6 | Electric Devices | 0000111010 | 1111000101 |
| 7 | Battery Devices | 0000101110 | 1111010001 |
| 8 | Battery Devices | 0001110110 | 1110001001 |
| 9 | Battery Devices | 0001101110 | 1110010001 |
| 10 | Battery Devices | 0000011110 | 1111100001 |
| 11 | Battery Devices | 0001011110 | 1110100001 |
| 12 | Battery Devices | 0001111010 | 1110000101 |

Figure 24:
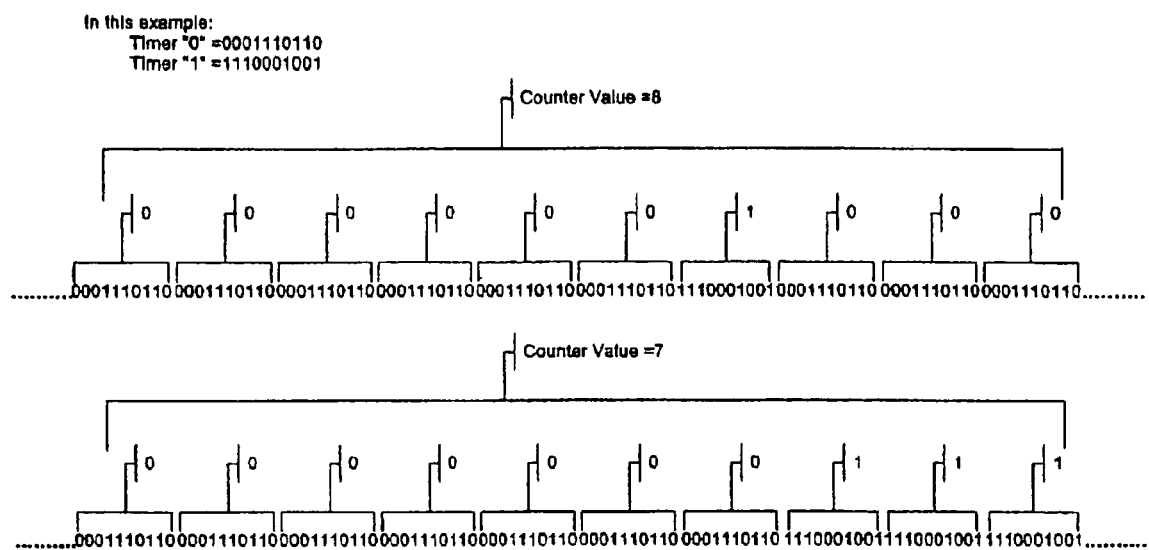
FIG. 24 is a diagram illustrating the use of sequence inversion keying (SIK) to encode or decode information with pseudo noise sequences.

In one embodiment, PN sequences are also used to encode information. Each PN sequence represents a first portion of a binary state, while the corresponding inverse of each PN sequence represents the opposite binary state. In this embodiment, the PN sequences are modulated/demodulated using Sequence Inversion Keying (SIK) to represent information bits. Each related group of endpoints is assigned at least one PN sequence (and its corresponding inverse) from Table 14. Each sequence in the data stream represents an information bit value 1, while the corresponding inverse of each sequence in the data stream represents an information bit value 0. Each bit of the information is encoded as either the assigned PN sequence or its inverse. FIG. 24 provides an example of a Sequence Inversion Keyed countdown timer where the counter value is the information component to be encoded with, or decoded from, an SIK bitstream.

Two-Way Command and Control

Figure 25:
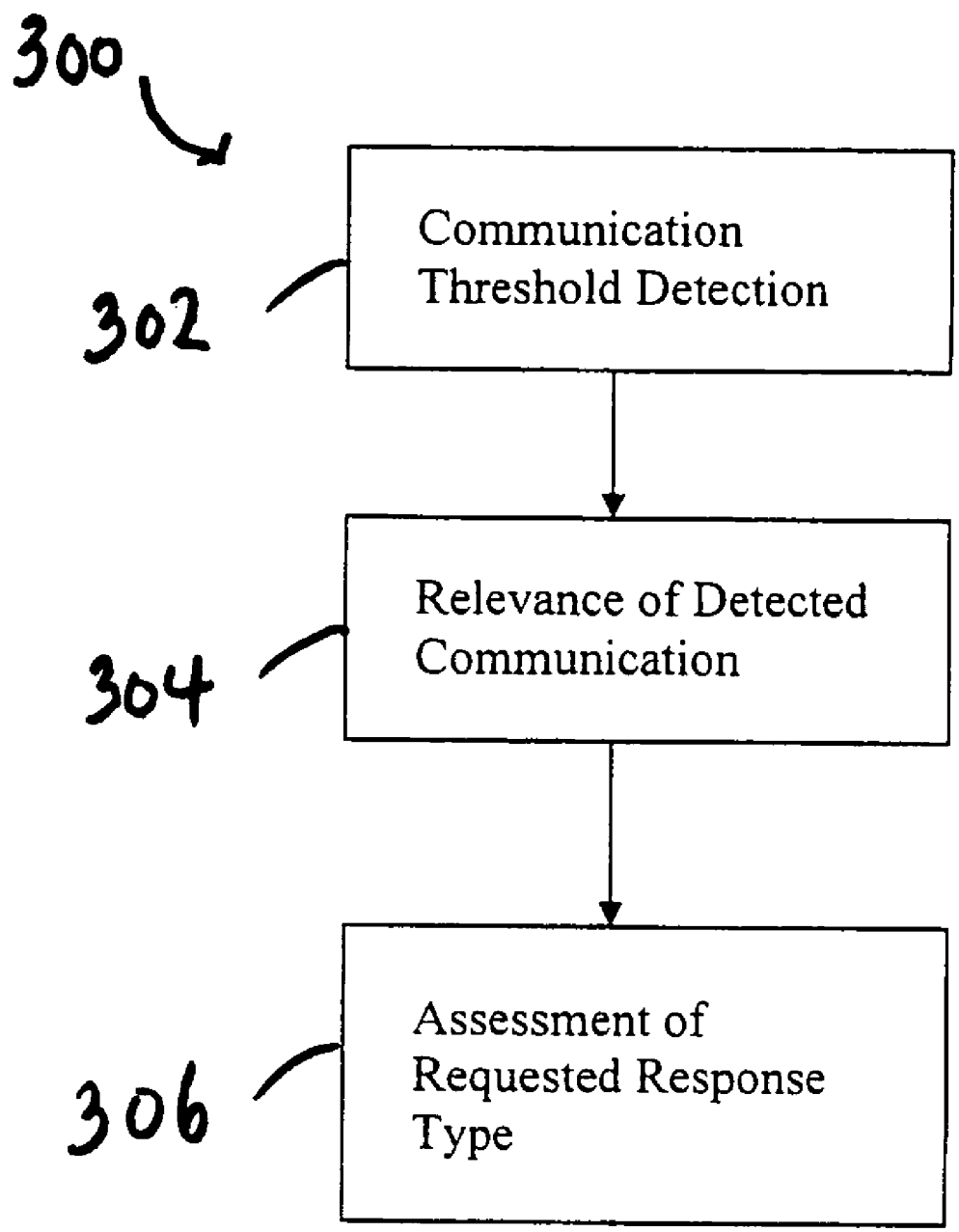
FIG. 25 is a diagram illustrating an example response to on-air communications potentially directed at a utility meter endpoint according to one embodiment of the invention.

The command and control frame used to issue command to two-way endpoints either individually or in groups is as described in foregoing section II.E.i.-System Protocol—Session Layer/Two-Way Command and Control and illustrated in FIG. 9A. The command and control frame also to realign the endpoint real-time clock. FIG. 25 is a flow diagram representation of the operation of the two-way communication command and control frame.

Multi-Mode Compatible Endpoints

One aspect of the invention is directed to an endpoint that is capable of communicating with the AMR system in a 1-way mode, a 1.5-way mode, and a 2-way mode without the need to be especially manufactured or configured in the field. According to one example embodiment, endpoint 208 (FIG. 22) is programmed to periodically bubble-up according to a first factory pre-set bubble-up time interval. In response to each bubble-up event occurring on the first time interval, endpoint 208 acquires utility meter consumption and other applicable data from utility meter 210, and transmits the data to the AMR system 212. This is an example of a one-way communications operating mode.

Endpoint 208 also bubbles up according to a second time interval that occurs at optionally different times from the first time interval. In response to bubble-up events occurring at each second interval, endpoint 208 activates transceiver 218 to operate in a receive mode for a short period of time. During this time, transceiver 218 is receptive to on-air communications that could be directed at endpoint 208. In one type of AMR system, the on-air communications include at least one PN sequence or its inverse. FIG. 25 illustrates some example operations 300 during this bubble-up cycle. At 302, endpoint performs a communication threshold detection. In one embodiment, a digital squelch scheme as described above is utilized to detect the presence of potentially relevant communications for endpoint 208.

At 304, the relevance of the communications is determined by a program running on CPU 216. In one embodiment, CPU 216 receives and buffers a demodulated bit stream. CPU compares the buffered bit stream against one of at least two known PN sequences. If any portion of the buffered sequence matches any of the known PN sequences, CPU 216 determines the received communication to be relevant.

Figure 26:
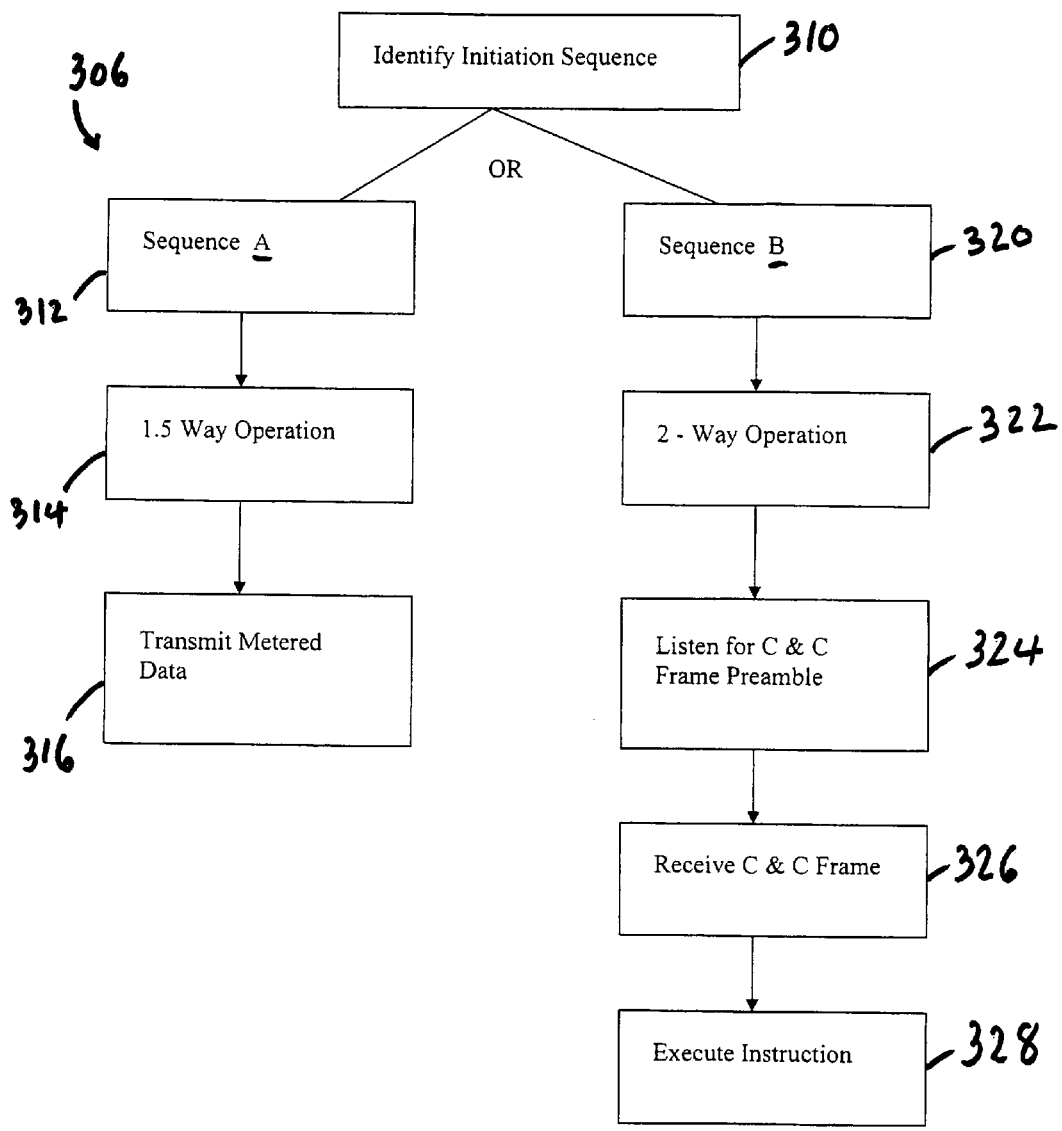
FIG. 26 is a diagram illustrating an example decision tree used for assessing an appropriate response type to an AMR communication containing initiation sequences representing the desired response type according to one aspect of the invention.

According to one aspect of the present invention, the AMR on-air communication contains two or more initiation sequences that represent the mode of response desired by the AMR system. At 206, CPU 216 assesses the type of response that is appropriate for the AMR system. In one embodiment, this assessment is based on the type of PN sequence received. FIG. 26 illustrates one example decision tree implemented by CPU 216. At 310, CPU 216 identifies the PN sequence from at least two known PN sequences to which endpoint 208 has been preconfigured to respond. For example, in one embodiment, CPU 216 is programmed to identify two PN sequences and their corresponding inverses, Sequence A, and Sequence B. Assuming the received sequence is Sequence A (312), CPU 216 responds by entering a 1.5-way mode of communication as indicated at 314. In this 1.5-way mode of operation, endpoint 208 immediately responds by transmitting its utility meter consumption data and other applicable data, as indicated at 316. There is no need for endpoint 208 to listen for, receive, or demodulate any further messages or instructions from AMR system 212.

Assuming that Sequence B has been identified (320), endpoint 208 responds in kind by entering a two-way mode of operation at 322. Pursuant to the two-way communication mode, endpoint 208 listens (324) for a beginning of command and control frame by comparing further received sequences against known command and control frame preambles. At 326, the command and control frame or frames are received by endpoint 208. At 328, CPU 216 causes endpoint 208 to execute the instructions received in the command and control frame(s).

In an alternative embodiment, the assessment of requested response type 306 is made based on identifying an information component encoded by one or more PN sequences. In this embodiment, various different communication initiation sequences are composed of different combinations of the same PN sequence (such as any one PN sequence listed in Table 14) and its inverse. CPU 216 is programmed to distinguish between at least two information-bearing combination sequences.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. In a system for automatic meter reading (AMR) of utility meters, a method for operating an endpoint to respond to wireless radio-frequency (RF) communications signals from a fixed or mobile reader, the RF communication signals including a preliminary portion and a command portion following the preliminary portion, the method comprising:
    listening for an incoming RF communication signal in which the preliminary portion is indicative of a start of the command portion and includes one of a predefined first sequence and a predefined second sequence; and
    detecting a presence of the first sequence or the second sequence in the preliminary portion of the RF communication signal;
    responding to a detection of the first or the second sequence wherein:
        responding to a detection of the first sequence includes processing the command portion of the RF communication signal; and
        responding to a detection of the second sequence includes transmitting a first set of data via the AMR system without necessarily processing the command portion.

2. The method of claim 1, wherein the responding to the detection of the second sequence excludes listening for any command portion.

3. The method of claim 1, and further comprising:
    transmitting a second set of data to the AMR system irrespective of any received preliminary portion of the RF communication signal.

4. The method of claim 3, wherein the second set of data is the same set of data as the first set of data.

5. The method of claim 3, and further comprising:
    responding to a bubble-up event, wherein the second set of data is transmitted as part of the responding to the bubble-up event.

6. The method of claim 1, wherein the listening, detecting, and responding are performed in response to a bubble-up event.

7. The method of claim 1, wherein the instruction includes a command and control frame.

8. The method of claim 1, wherein the first set of data includes utility meter data.

9. The method of claim 1, wherein at least one of the first and the second sequences are pseudo noise (PN) sequences.

10. The method of claim 1, wherein the preliminary portion of the RF communication signal is an information-bearing signal encoded with sequence inversion keying (SIK) of at least one pseudo noise (PN) sequence.

11. The method of claim 1, and further comprising:
    while listening for any command portion receiving the command portion; and
    executing an instruction based on the command portion.

12. A utility meter endpoint, comprising:
    a central processing unit (CPU);
    a utility meter interface adapted to acquire utility meter information for the CPU from a utility meter;
    a radio-frequency (RF) transceiver interfaced with the CPU and adapted to receive and transmit wireless radio-communications via an AMR system;
    wherein the endpoint is configured to:
        operate in a receiving mode that is receptive to incoming radio frequency (RF) communications signals from the AMR system that include a preliminary portion and a command portion following the preliminary portion, the preliminary portion being indicative of an AMR system to which the endpoint is responsive;
        detect a preliminary portion of an incoming communication signal, the preliminary portion including one of a known first sequence and a known second sequence; and
        determine, based on the preliminary portion, whether to respond to the incoming communication signal, wherein:
            responding to a presence of the first sequence includes at least operating in a receiving mode that is receptive to the command portion; and
            responding to a presence of the second sequence includes at least operating in a transmit mode to send a first set of data via the AMR system.

13. The utility meter endpoint of claim 12, wherein the CPU and transceiver are configured to transmit a second set of data to the AMR system.

14. The utility meter endpoint of claim 13, wherein the endpoint is configured to respond to a bubble-up event, wherein the second set of data is transmitted as part of the responding to the bubble-up event.

15. The utility meter endpoint of claim 12, wherein the command portion includes a command and control frame.

16. The utility meter endpoint of claim 12, wherein the first set of data includes utility meter data.

17. The utility meter endpoint of claim 12, wherein the preliminary portion of the RF communication signal is encoded using sequence inversion keying (SIK).

18. The utility meter endpoint of claim 12, wherein at least one of the first and the second sequences are pseudo noise (PN) sequences.

19. The utility meter endpoint of claim 12, wherein the preliminary portion of the RF communication signal is a message-bearing signal encoded with sequence inversion keying (SIK) of at least one pseudo noise (PN) sequence.

20. The utility meter endpoint of claim 12 wherein the endpoint is capable of operating in all of a plurality of operational modes including a one-way utility meter reading mode, a one and halfway utility meter reading mode and a two-way utility meter reading mode.

* * * * *